United States Patent
Oogami et al.

(10) Patent No.: US 7,098,613 B2
(45) Date of Patent: Aug. 29, 2006

(54) HIGH VOLTAGE DEFLECTION CIRCUIT

(75) Inventors: Tomonari Oogami, Takatsuki (JP); Takahumi Nagasue, Kumamoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 617 days.

(21) Appl. No.: 10/333,929

(22) PCT Filed: Aug. 29, 2001

(86) PCT No.: PCT/JP01/07430

§ 371 (c)(1), (2), (4) Date: Feb. 5, 2003

(87) PCT Pub. No.: WO02/19696

PCT Pub. Date: Mar. 7, 2002

(65) Prior Publication Data

US 2003/0151311 A1    Aug. 14, 2003

(30) Foreign Application Priority Data

Aug. 31, 2000  (JP) ............................. 2000-262569
Oct. 2, 2000   (JP) ............................. 2000-301767
Aug. 24, 2001  (JP) ............................. 2001-254629

(51) Int. Cl.
  H01J 29/70  (2006.01)
  H01J 29/76  (2006.01)
  H01J 29/56  (2006.01)

(52) U.S. Cl. ...................................... 315/408; 315/371

(58) Field of Classification Search ................ 315/408, 315/399, 364, 395, 396, 371, 411
See application file for complete search history.

(56) References Cited

U.S. PATENT DOCUMENTS

| 4,242,714 A | * | 12/1980 | Yoshida et al. | ............. 361/152 |
| 4,468,593 A | * | 8/1984  | Haferl         | ............. 315/371 |
| 4,707,640 A | * | 11/1987 | Onozawa et al. | ............. 315/408 |
| 5,939,844 A | * | 8/1999  | Shiomi et al.  | ............. 315/408 |
| 6,288,504 B1| * | 9/2001  | Imamura et al. | ............. 315/411 |

FOREIGN PATENT DOCUMENTS

| JP | 9-135362   | 5/1997  |
| JP | 9-307781   | 11/1997 |
| JP | 9-307782   | 11/1997 |
| JP | 2000333034 | 11/2000 |

OTHER PUBLICATIONS

English Language Abstract of JP 9-135362.
English Language Abstract of JP 2000-333034.

* cited by examiner

*Primary Examiner*—Don Wong
*Assistant Examiner*—Angela M Lie
(74) *Attorney, Agent, or Firm*—Greenblum & Bernstein, P.L.C.

(57) ABSTRACT

A resonant pulse voltage having a positive polarity is applied by a first resonant circuit and a third resonant circuit to a horizontal deflection coil included in the first resonant circuit, and a resonant pulse voltage having a negative polarity which is opposite to that of resonant pulse voltages applied by the first resonant circuit and the third resonant circuit is applied to only a horizontal deflection coil in the first resonant circuit without being applied to a transistor by a second resonant circuit.

19 Claims, 24 Drawing Sheets

F I G. 7
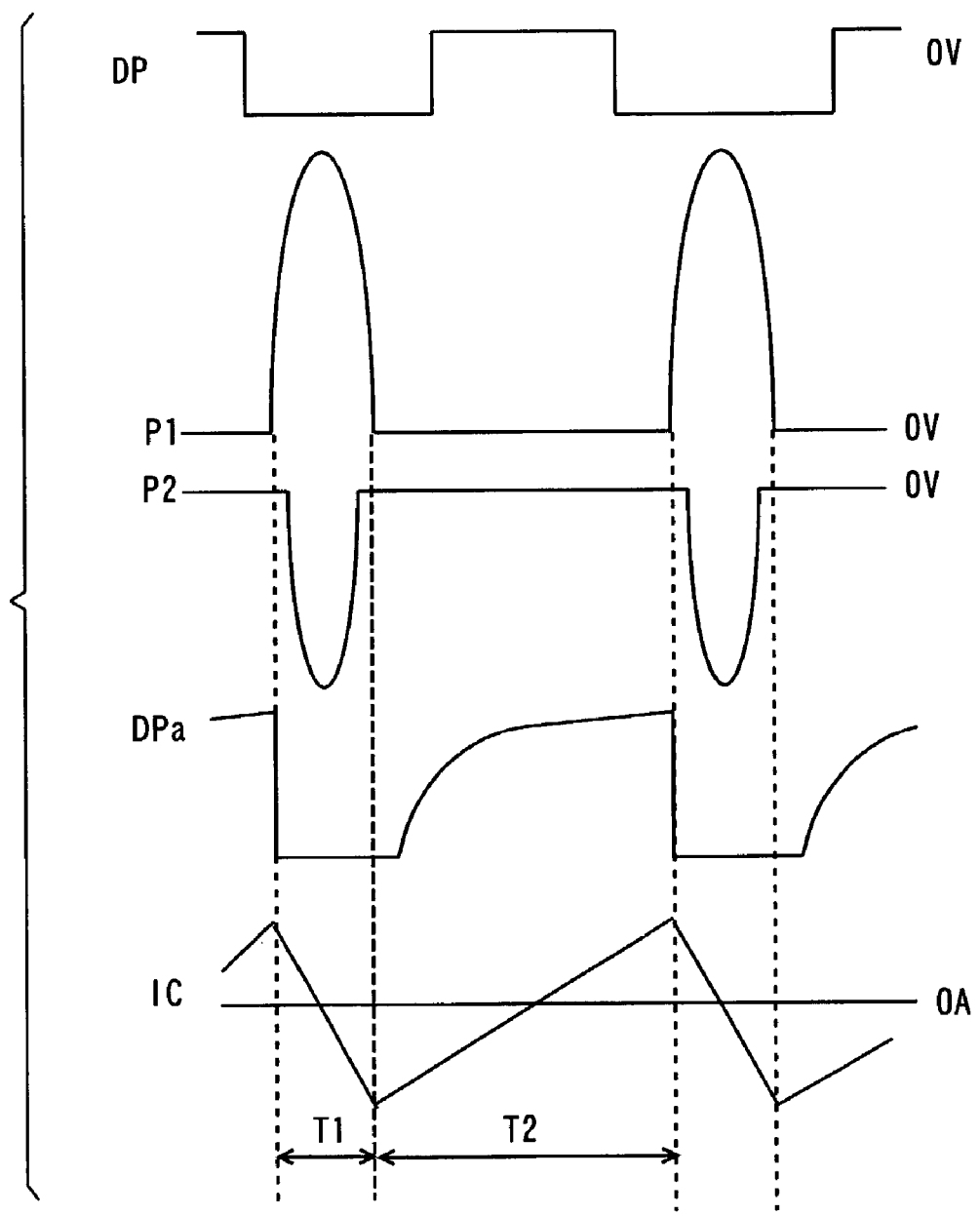

F I G. 1 1
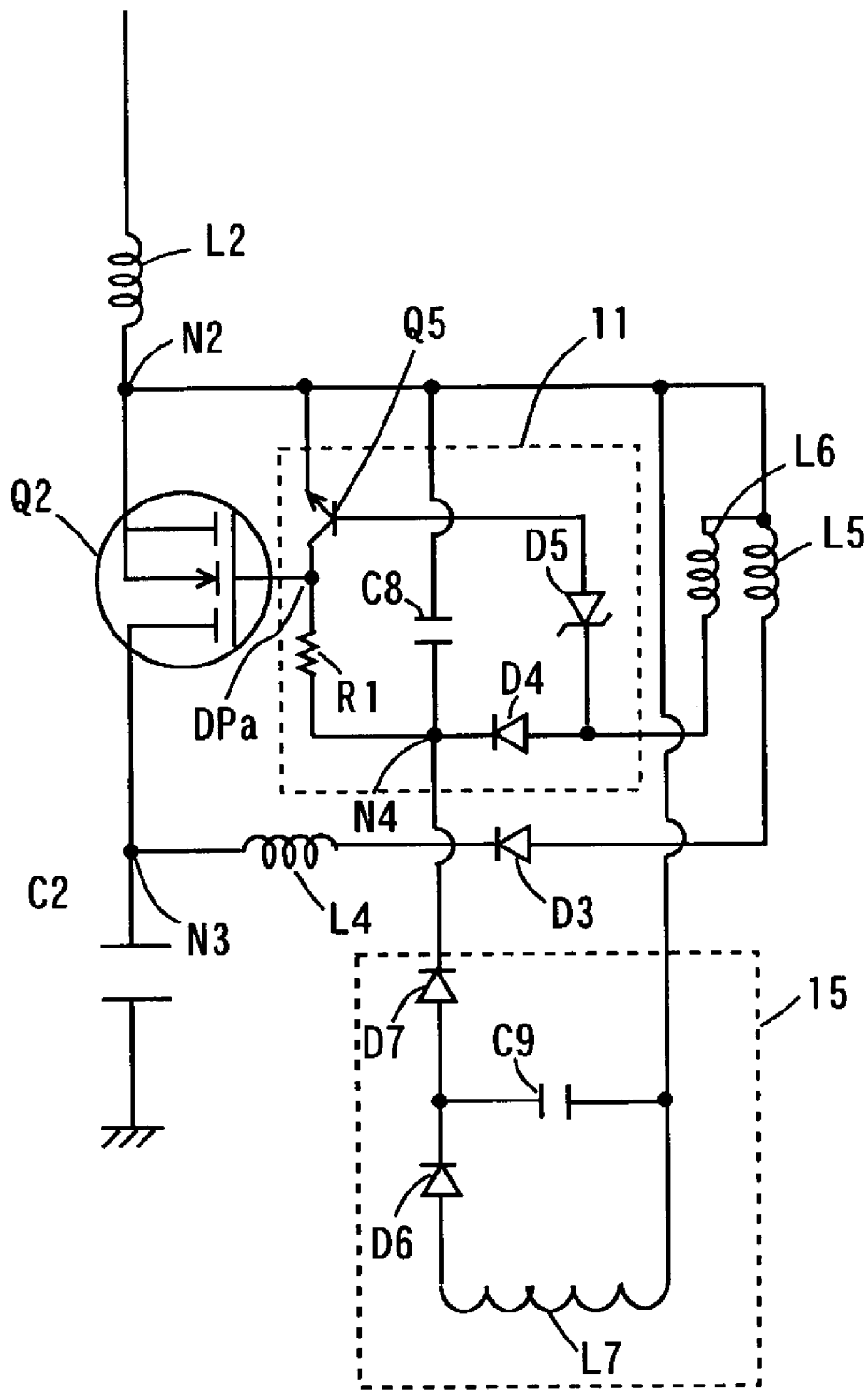

F I G. 1 2
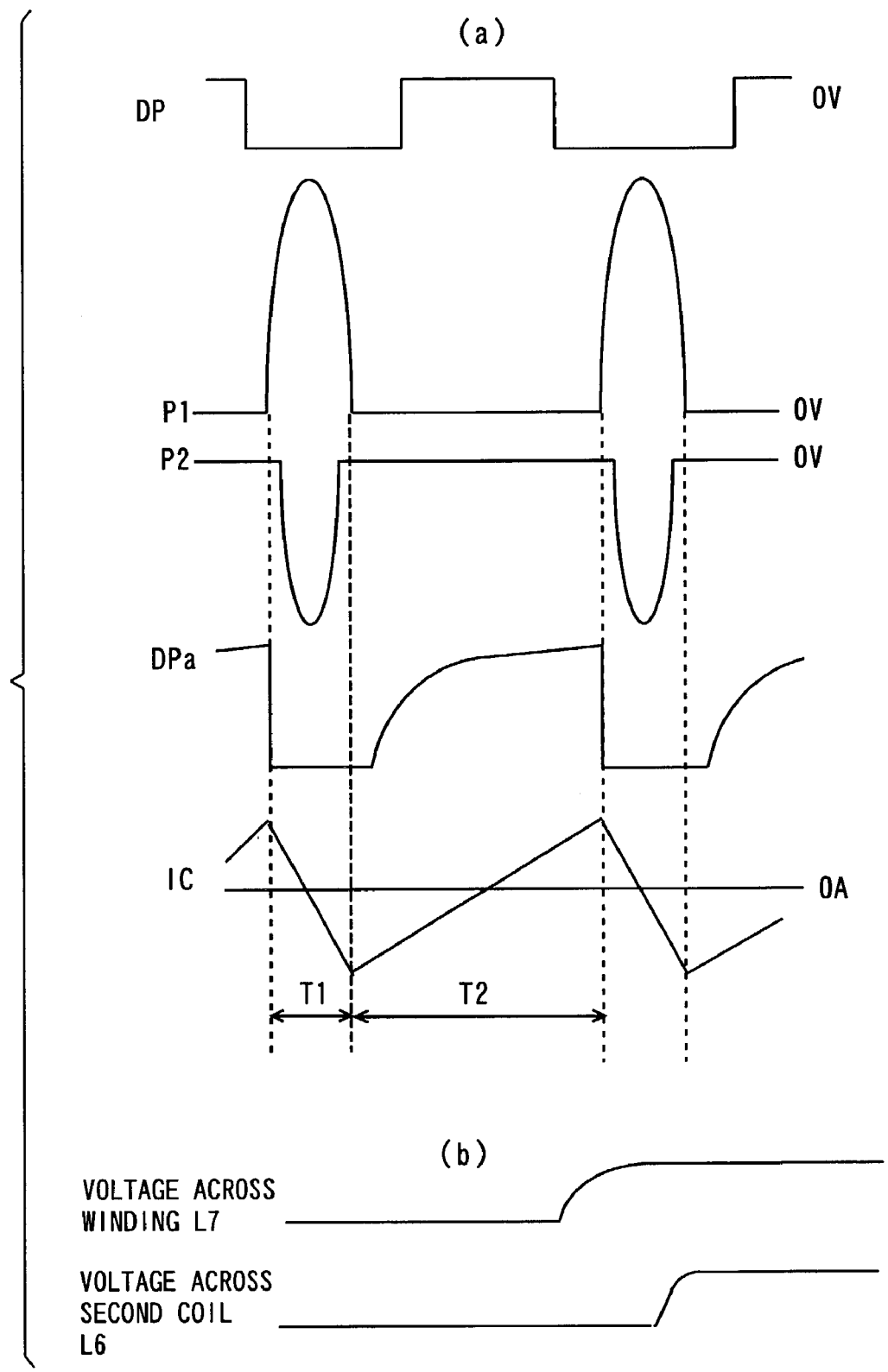

F I G. 2 0
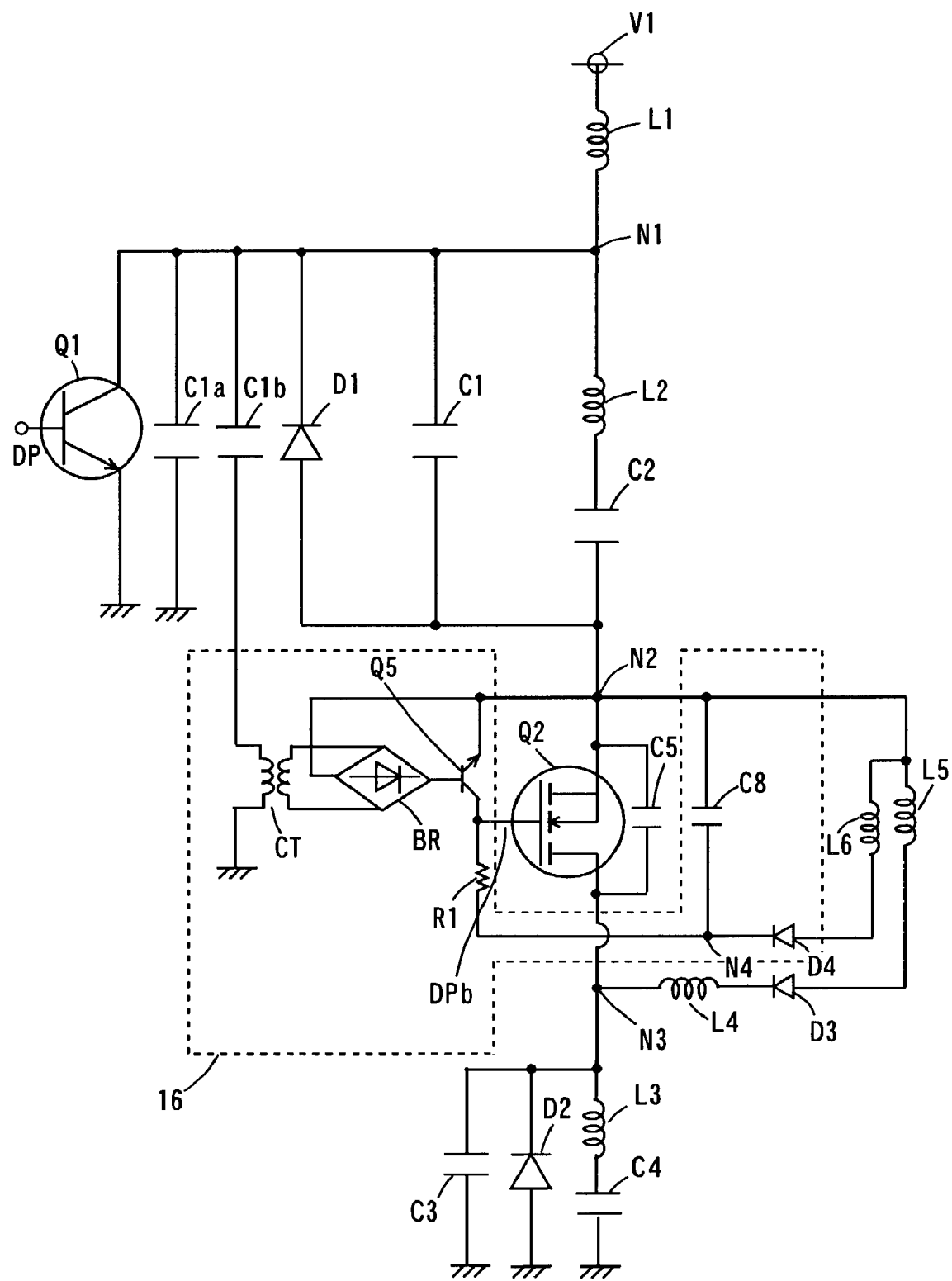

HIGH VOLTAGE DEFLECTION CIRCUIT

TECHNICAL FIELD

The present invention relates to a high voltage deflection circuit for supplying a deflection current to a deflection coil, and more particularly, to a high voltage deflection circuit that supplies a deflection current to a horizontal deflection coil in a television receiver.

BACKGROUND ART

In cathode-ray tubes (CRTs) for image display used for television receivers, a horizontal deflection circuit and a vertical deflection circuit that respectively supply a horizontal deflection current and a vertical deflection current to a horizontal deflection coil and a vertical deflection coil are used, and electronic beams sent out of an electronic gun are deflected in the horizontal direction and the vertical direction by the operations of the circuits.

FIG. 21 is a circuit diagram showing an example of the configuration of a conventional horizontal deflection circuit. The conventional horizontal deflection circuit shown in FIG. 21 comprises a horizontal switching transistor (hereinafter referred to as a transistor) Q11, a resonant capacitor C11, a damper diode D11, a horizontal deflection coil L12, an S-correction capacitor C12, and a primary coil L11 of a deflection transformer.

One end of the primary coil L11 of the deflection transformer is connected to a power supply V11, and the other end thereof is connected to a node N11. The transistor Q11 has its collector connected to the node N11, its emitter connected to a ground, and its base to which a drive pulse DP which is synchronized with the horizontal frequency is applied.

The resonant capacitor C11 and the damper diode D11 are connected in parallel between the node N11 and a ground terminal. The horizontal deflection coil L12 and the S-correction capacitor C12 are connected in series between the node N11 and the ground terminal. The resonant capacitor C11, the damper diode D11, the horizontal deflection coil L12, and the S-correction capacitor C12 constitute a resonant circuit.

By the above-mentioned configuration, when the transistor Q11 is rendered conductive upon application of the drive pulse DP which is synchronized with the horizontal frequency to the transistor Q11, energy is supplied to the resonant circuit from the power supply V11 through the primary coil L11 of the deflection transformer. Accordingly, a deflection current having a predetermined slope flows through the horizontal deflection coil L12.

When the transistor Q11 is then rendered nonconductive, the resonant circuit resonates, whereby a resonant pulse voltage is generated by the energy previously stored. Consequently, a resonant pulse voltage is applied to the horizontal deflection coil L12 by the resonant circuit, so that a deflection current having a slope in the opposite direction to the predetermined slope flows through the horizontal deflection coil L12.

By repeating the above-mentioned operations, a sawtooth deflection current flows through the horizontal deflection coil L12. Consequently, a magnetic field is generated in the deflection coil L12, thereby making it possible to successively deflect electronic beams in the horizontal direction.

FIG. 22 is a block diagram showing another example of the configuration of the conventional horizontal deflection circuit. The conventional horizontal deflection circuit shown in FIG. 22 comprises a horizontal switching transistor (hereinafter abbreviated as a transistor) Q11, a power supply unit 101, a first resonant circuit 102, and a second resonant circuit 103.

The transistor Q11 has its collector connected to the power supply unit 101 and the first resonant circuit 102, its emitter connected to a ground, and its base to which a drive pulse DP which is synchronized with the horizontal frequency is applied. The first resonant circuit 102 comprises a horizontal deflection coil. The first resonant circuit 102 and the second resonant circuit 103 are connected in series. The first resonant circuit 102 is connected to the power supply unit 101, and the second resonant circuit 103 is grounded.

In the above-mentioned manner, resonance operations performed by the first and second resonant circuits 102 and 103 which are connected in series are controlled by the transistor Q11, so that a resonant pulse voltage is generated by the first and second resonant circuits 102 and 103 using energy supplied from the power supply unit 101.

FIG. 23 is a circuit diagram showing the configuration of the conventional horizontal deflection circuit shown in FIG. 22. The conventional horizontal deflection circuit shown in FIG. 23 comprises a transistor Q11, resonant capacitors C11 and C13, damper diodes D11 and D12, a horizontal deflection coil L12, a resonant coil L13, S-correction capacitors C12 and C14, and a primary coil L11 of a deflection transformer.

One end of the primary coil L11 of the deflection transformer is connected to a power supply V11, and the other end thereof is connected to a node N11. The power supply V11 and the primary coil L11 of the deflection transformer constitute the power supply unit 101 shown in FIG. 22. The transistor Q11 is the transistor Q11 shown in FIG. 22, and has its collector connected to the node N11.

The resonant capacitor C11 and the damper diode D11 are connected in parallel between the node N11 and a node N12. The horizontal deflection coil L12 and the S-correction capacitor C12 are connected in series between the node N11 and the node N12. The resonant capacitor C11, the damper diode D12, the horizontal deflection coil L12, and the S-correction capacitor C12 constitute the first resonant circuit 102 shown in FIG. 22.

The resonant capacitor C13 and the damper diode D12 are connected in parallel between the node N12 and a ground terminal. The resonant coil L13 and the S-correction capacitor C14 are connected in series between the node N12 and the ground terminal. The resonant capacitor C13, the damper diode D12, the resonant coil L13, and the S-correction capacitor C14 constitute the second resonant circuit 103 shown in FIG. 22.

By the above-mentioned configuration, a horizontal deflection circuit of a diode modulator type capable of correcting pincushion distortion and horizontal amplitude without varying a high voltage output generated by the deflection transformer is constructed.

FIG. 24 is a timing chart for explaining the operations of the horizontal deflection circuit shown in FIG. 23. As shown in FIG. 24, when the transistor Q11 is rendered conductive (an ON period T2 shown in FIG. 24) upon application of a drive pulse DP which is synchronized with the horizontal frequency to the transistor Q11, energy is supplied to the first and second resonant circuits 102 and 103 from the power supply V11 through the primary coil L11 of the deflection transformer, so that a deflection current IC having a predetermined slope flows through the deflection coil 13.

When the transistor Q11 is then rendered non-conductive (an OFF period T1 shown in FIG. 24), the first resonant circuit 102 and the second resonant circuit 103 respectively resonate, whereby resonant pulse voltages are respectively generated by the energy previously stored. Consequently, a resonant pulse voltage P is applied to the horizontal deflection coil L12 by the first resonant circuit 102 and the second resonant circuit 103, so that a deflection current IC having a slope in the opposite direction to the predetermined slope flows through the horizontal deflection coil L12.

By repeating the above-mentioned operations, a sawtooth deflection current IC as shown in FIG. 24 flows through the horizontal deflection coil L12. Consequently, a magnetic field is generated in the deflection coil L12, thereby making it possible to successively deflect electron beams in the horizontal direction.

In recent years, in the television receiver, the frequency is increased in a high-definition television, a monitor for a computer, and so forth, so that the horizontal frequency is liable to be increased. When the horizontal frequency is increased, the pulse width of the resonant pulse voltage P is narrowed. However, the amount of energy in the resonant pulse voltage P is determined by a power supply voltage. When the pulse width is narrowed, therefore, the pulse height is increased.

However, the pulse height of the resonant pulse voltage P is limited by the voltage resistance of the transistor Q11. Accordingly, the pulse height of the resonant pulse voltage P cannot be increased as it is. In order to obtain a predetermined deflection current, therefore, the inductance value of the horizontal deflection coil L12 must be decreased. When the inductance value is decreased, it is difficult to adjust a magnetic field generated by the horizontal deflection coil L12. Accordingly, the optical characteristics and the deflection distortion of the electron beams released form the cathode-ray tube are degraded.

Furthermore, the deflection current is inverse proportional to the inductance value of the horizontal deflection coil L12. When the inductance value of the horizontal deflection coil L12 is decreased, therefore, the deflection current is increased. Accordingly, the loss of power in each of electric devices through which the deflection current flows is increased, thereby increasing power consumption.

DISCLOSURE OF INVENTION

An object of the present invention is to provide a high voltage deflection circuit capable of increasing the inductance value of a deflection coil to improve the optical characteristics and the distortion characteristics of a cathode-ray tube as well as reducing a deflection current to reduce power consumption.

Another object of the present invention is to provide a high voltage deflection circuit capable of increasing the inductance value of a deflection coil to improve the optical characteristics and the distortion characteristics of a cathode-ray tube as well as reducing a deflection current to reduce power consumption, and further capable of stably performing a circuit operation.

A high voltage deflection circuit according to an aspect of the present invention is a high voltage deflection circuit for supplying a deflection current to a deflection coil, comprising first resonant means including the deflection coil for applying a first resonant pulse voltage to the deflection coil; switching means connected to the first resonant means for performing a switching operation in response to a predetermined drive signal; and second resonant means connected in series with the deflection coil and supplied with a drive voltage by a resonance operation of the first resonant means for applying to the deflection coil a second resonant pulse voltage having an opposite polarity to that of the first resonant pulse voltage.

In the high voltage deflection circuit according to the present invention, the second resonant means is connected in series with the deflection coil included in the first resonant means, and the switching means for performing the switching operation in response to the predetermined drive signal is connected to the first resonant means. Accordingly, the first resonant pulse voltage is applied to the deflection coil by the first resonant means, and the second resonant pulse voltage having an opposite polarity to that of the first resonant pulse voltage is applied to the deflection coil by the second resonant means.

At this time, the pulse voltage applied to the deflection coil is the sum of the first and second resonant pulse voltages, so that a pulse voltage greater than the first resonant pulse voltage can be applied to the deflection coil. Further, the second resonant pulse voltage is not applied to the switching means, and only the first resonant pulse voltage is applied thereto, so that a pulse voltage lower than the pulse voltage applied to the deflection coil can be applied to the switching means.

Consequently, the pulse voltage applied to the deflection coil can be increased without being limited by the voltage resistance of the switching means. Accordingly, it is possible to increase the inductance value of the deflection coil to improve the optical characteristics and the distortion characteristics of a cathode-ray tube as well as to reduce a deflection current to reduce power consumption.

The first resonant means may be supplied with electric power through a first coil of a deflection transformer connected to a power supply, and the second resonant means may comprise a resonant capacitor, and a switching device connected in parallel with the resonant capacitor and supplied with a voltage obtained by smoothing a pulse voltage as a power supply voltage, the pulse voltage having an opposite polarity to that of the first resonant pulse voltage and being induced in a second coil of the deflection transformer by the first resonant pulse voltage.

In this case, the electric power is supplied to the first resonant means through the first coil of the deflection transformer connected to the power supply, and the voltage obtained by smoothing the pulse voltage having an opposite polarity to that of the first resonant pulse voltage and induced in the second coil of the deflection transformer by the first resonant pulse voltage is supplied as the power supply voltage to the switching device connected in parallel with the resonant capacitor in the second resonant means. Consequently, only the first resonant pulse voltage by the first resonant means can be applied to the switching means connected to the first resonant means without applying the second resonant pulse voltage by the second resonant means to the switching means.

The second resonant means may further comprise drive means for producing a switching device drive signal using a pulse voltage having an opposite polarity to that of the first resonant pulse voltage and induced in a third coil of the deflection transformer by the first resonant pulse voltage, and the switching device may perform a switching operation in response to the switching device drive signal for produced by the drive means.

In this case, the switching device performs the switching operation in response to the switching device drive signal for a produced using the pulse voltage having an opposite polarity to that of the first resonant pulse voltage and induced in the third coil of the deflection transformer by the first resonant pulse voltage. Accordingly, the second resonant means performs a resonance operation in response to the resonance operation performed by the first resonant means, thereby making it possible to apply the second resonant pulse voltage to the deflection coil in synchronization with the first resonant pulse voltage.

The second resonant means may further comprise drive means for producing a switching device drive signal on the basis of the drive signal, and the switching device may perform a switching operation in response to the switching device drive signal by the drive means.

In this case, the switching device performs the switching operation in response to the switching device drive signal produced on the basis of the drive signal of the switching means. Accordingly, the second resonant means performs a resonance operation in response to the resonance operation performed by the first resonant means, thereby making it possible to apply the second resonant pulse voltage to the deflection coil in synchronization with the first resonant pulse voltage.

The second resonant means may further comprise current-voltage conversion means for converting a current flowing through the resonant capacitor into a voltage to produce a switching device drive signal, and the switching device may perform a switching operation in response to the switching device drive signal produced by the current-voltage conversion means.

In this case, the switching device performs the switching operation in response to the drive signal for switching produced by converting the current flowing through the resonant capacitor into the voltage. Accordingly, the second resonant means performs a resonance operation in response to the resonance operation performed by the first resonant means, thereby making it possible to apply the second resonant pulse voltage to the deflection coil in synchronization with the first resonant pulse voltage.

The drive signal may be a drive signal which is synchronized with the horizontal frequency.

In this case, the switching means performs the switching operation in response to the drive signal which is synchronized with the horizontal frequency. Accordingly, the high voltage deflection circuit according to the present invention can be used as a horizontal deflection circuit, thereby making it possible to realize a horizontal deflection circuit having a high operation frequency.

The first resonant means may comprise an S-correction capacitor connected in series with the deflection coil, a resonant capacitor connected in parallel with the deflection coil, the second resonant means and the S-correction capacitor, and a damper diode connected in parallel with the resonant capacitor.

In this case, pincushion distortion can be corrected by modulating a power supply voltage for a power supply unit.

The high voltage deflection circuit may further comprise third resonant means connected in series with the first resonant means through the second resonant means for performing a resonance operation in response to the switching operation of the switching means.

In this case, a high voltage deflection circuit of a diode modulator type can be realized by the first and third resonant means.

The first resonant means may comprise a first S-correction capacitor connected in series with the deflection coil, a first resonant capacitor connected in parallel with the deflection coil and the first S-correction capacitor, and a first damper diode connected in parallel with the first resonant capacitor, and the third resonant means may comprise a resonant coil, a second S-correction capacitor connected in series with the resonant coil, a second resonant capacitor connected in parallel with the resonant coil and the second S-correction capacitor, and a second damper diode connected in parallel with the second resonant capacitor.

In this case, a high voltage deflection circuit of a diode modulator type can be constituted by the first and third resonant means. Accordingly, pincushion distortion can be corrected without varying a high voltage output generated by the deflection transformer by modulating a current flowing through the second S-correction capacitor.

The high voltage deflection circuit may further comprise voltage supply means for supplying a drive voltage to the second resonant means until the second resonant means starts a resonance operation.

The drive voltage is supplied to the second resonant means by the resonance operation performed by the first resonant means, and the second resonant means attempts to generate the second resonant pulse voltage. Unless a sufficient voltage to drive the second resonant means is applied as the drive voltage supplied by the resonance operation performed by the first resonant means, the resonance operation performed by the second resonant means may not, in some cases, be stabilized. Therefore, the drive voltage is supplied to the second resonant means by the voltage supply means before the second resonant means starts the resonance operation, thereby making it possible to stably operate the second resonant means irrespective of the timing of the drive voltage supplied by the resonance operation performed by the first resonant means.

Consequently, the pulse voltage applied to the deflection coil can be increased without being limited by the voltage resistance of the switching means. Accordingly, it is possible to increase the inductance value of the deflection coil to improve the optical characteristics and the distortion characteristics of a cathode-ray tube as well as to further reduce a deflection current to reduce power consumption. Further, it is possible to stably perform a circuit operation.

The first resonant means may be supplied with electric power through a first coil of a deflection transformer connected to a power supply, the second resonant means may comprise a resonant capacitor, and a first switching device connected in parallel with the resonant capacitor and supplied with a voltage obtained by smoothing a pulse voltage as a power supply voltage, the pulse voltage having an opposite polarity to that of the first resonant pulse voltage and being induced in a second coil of the deflection transformer by the first resonant pulse voltage, and the voltage supply means may supply the drive voltage to the first switching device until the second resonant means starts the resonance operation.

In this case, the electric power is supplied to the first resonant means through the first coil of the deflection transformer connected to the power supply, and the voltage obtained by smoothing the pulse voltage having an opposite polarity to that of the first resonant pulse voltage and induced in the second coil of the deflection transformer by the first resonant pulse voltage is supplied as the power supply voltage to the first switching device connected in parallel with the resonant capacitor in the second resonant means. Further, the drive voltage is supplied to the first switching device by the voltage supply means until the second resonant means starts the resonance operation.

Consequently, only the first resonant pulse voltage by the first resonant means can be applied to the switching means connected to the first resonant means without applying the second resonant pulse voltage by the second resonant means to the switching means. Further, the drive voltage is supplied to the first switching device by the voltage supply means until the second resonant means starts the resonance operation. Accordingly, a sufficient voltage to drive the first switching device can be supplied before the first resonant means performs the resonance operation, thereby making it possible to always stably operate the second resonant means.

The voltage supply means may comprise an external power supply for supplying the drive voltage to the first switching device until the second resonant means starts the resonance operation.

In this case, the drive voltage is supplied to the first switching device by the external power supply until the second resonant means starts the resonance operation. Accordingly, a sufficient voltage to drive the first switching device can be supplied before the first resonant means performs the resonance operation, thereby making it possible to always stably operate the second resonant means.

The voltage supply means may comprise a DC power supply, and a second switching device that supplies the voltage to the first switching device as a drive voltage from the DC power supply until the second resonant means starts the resonance operation.

In this case, the voltage from the DC power supply is supplied as the drive voltage to the first switching device by the second switching device until the second resonant means starts the resonance operation. Accordingly, a sufficient voltage to drive the first switching device can be supplied before the first resonant means performs the resonance operation, thereby making it possible to always stably operate the second resonant means.

The second resonant means may further comprise drive means for producing a switching device drive signal using a pulse voltage having an opposite polarity to that of the first resonant pulse voltage and induced in a third coil of the deflection transformer by the first resonant pulse voltage, and the first switching device may perform a switching operation in response to the switching device drive signal produced by the drive means.

In this case, the first switching device performs the switching operation in response to the switching device drive signal produced using the pulse voltage having an opposite polarity to that of the first resonant pulse voltage and induced in the third coil of the deflection transformer by the first resonant pulse voltage. Accordingly, the second resonant means can perform the resonance operation in response to the resonance operation performed by the first resonant means, and the second resonant pulse voltage can be applied to only the deflection coil in synchronization with the first resonant pulse voltage.

The drive signal may be a drive signal which is synchronized with the horizontal frequency.

In this case, the switching means performs the switching operation by the drive signal which is synchronized with the horizontal frequency. Accordingly, the high voltage deflection circuit according to the present invention can be used as a horizontal deflection circuit, thereby making it possible to realize a horizontal deflection circuit having a high operation frequency.

The first resonant means may comprise an S-correction capacitor connected in series with the deflection coil, a resonant capacitor connected in parallel with the deflection coil, the second resonant means and the S-correction capacitor, and a damper diode connected in parallel with the resonant capacitor.

In this case, pincushion distortion can be corrected by modulating a power supply voltage for a power supply unit.

The high voltage deflection circuit may further comprise third resonant means connected in series with the first resonant means through the second resonant means for performing a resonance operation in response to the switching operation of the switching means.

In this case, a high voltage deflection circuit of a diode modulator type can be realized by the first and third resonant means.

The first resonant means may comprise a first S-correction capacitor connected in series with the deflection coil, a first resonant capacitor connected in parallel with the deflection coil and the first S-correction capacitor, and a first damper diode connected in parallel with the first resonant capacitor, and the third resonant means may comprise a resonant coil, a second S-correction capacitor connected in series with the resonant coil, a second resonant capacitor connected in parallel with the resonant coil and the second S-correction capacitor, and a second damper diode connected in parallel with the second resonant capacitor.

In this case, a high voltage deflection circuit of a diode modulator type is constituted by the first and third resonant means. Accordingly, pincushion distortion can be corrected without varying a high voltage output generated by the deflection transformer by modulating a current flowing through the second S-correction capacitor.

A high voltage deflection circuit according to another aspect of the present invention is a high voltage deflection circuit for supplying a deflection current to a deflection coil, comprising a first resonant circuit, including the deflection coil, that applies a first resonant pulse voltage to the deflection coil; a switching circuit, connected to the first resonant circuit, that performs a switching operation in response to a predetermined drive signal; and a second resonant circuit, connected in series with the deflection coil and supplied with a drive voltage by the resonance operation of the first resonant circuit, that applies to the deflection coil a second resonant pulse voltage having an opposite polarity to that of the first resonant pulse voltage.

In the high voltage deflection circuit according to the present invention, the second resonant circuit is connected in series with the deflection coil included in the first resonant circuit, and the switching circuit that performs the switching operation in response to the predetermined drive signal is connected to the first resonant circuit, so that the first resonant pulse voltage is applied to the deflection circuit by the first resonant circuit, and the second resonant pulse voltage having an opposite polarity to that of the first resonant pulse voltage is applied to the deflection coil by the second resonant circuit.

At this time, the pulse voltage applied to the deflection coil is the sum of the first and second resonant pulse voltages, so that a pulse voltage greater than the first resonant pulse voltage can be applied to the deflection coil. Further, the second resonant pulse voltage is not applied to the switching circuit, and only the first resonant pulse voltage is applied thereto, so that a pulse voltage lower than the pulse voltage applied to the deflection coil can be applied to the switching circuit.

Consequently, the pulse voltage applied to the deflection coil can be increased without being limited by the voltage resistance of the switching circuit. Accordingly, it is possible to increase the inductance value of the deflection coil to improve the optical characteristics and the distortion characteristics of a cathode-ray tube as well as to reduce a deflection current to reduce power consumption.

The high voltage deflection circuit may further comprise a third resonant circuit, connected in series with the first resonant circuit through the second resonant circuit, that performs the resonance operation in response to the switching operation performed by the switching circuit.

In this case, a high voltage deflection circuit of a diode modulator type can be realized by the first and third resonant circuits.

BRIEF DESCRIPTION OF DRAWINGS

FIG. 7 is a timing chart for explaining the operations of the horizontal deflection circuit shown in FIG. 6.

FIG. 11 is a timing chart showing an example of the configuration of a drive circuit in the horizontal deflection circuit shown in FIG. 10.

FIG. 12 is a timing chart for explaining the operations of the horizontal deflection circuit shown in FIG. 10 and a timing chart for explaining the operations at the time of starting a power supply for the drive circuit shown in FIG. 11.

FIG. 20 is a circuit diagram showing the configuration of a horizontal deflection circuit according to a ninth embodiment of the present invention.

BEST MODE FOR CARRYING OUT THE INVENTION

A horizontal deflection circuit used for a cathode-ray tube in a television receiver will be described as an example of a high voltage deflection circuit according to the present invention. The high voltage deflection circuit to which the present invention is applied is not particularly limited to the horizontal deflection circuit. For example, it is similarly applicable to another high voltage deflection circuit such as a vertical deflection circuit.

Figure 1:
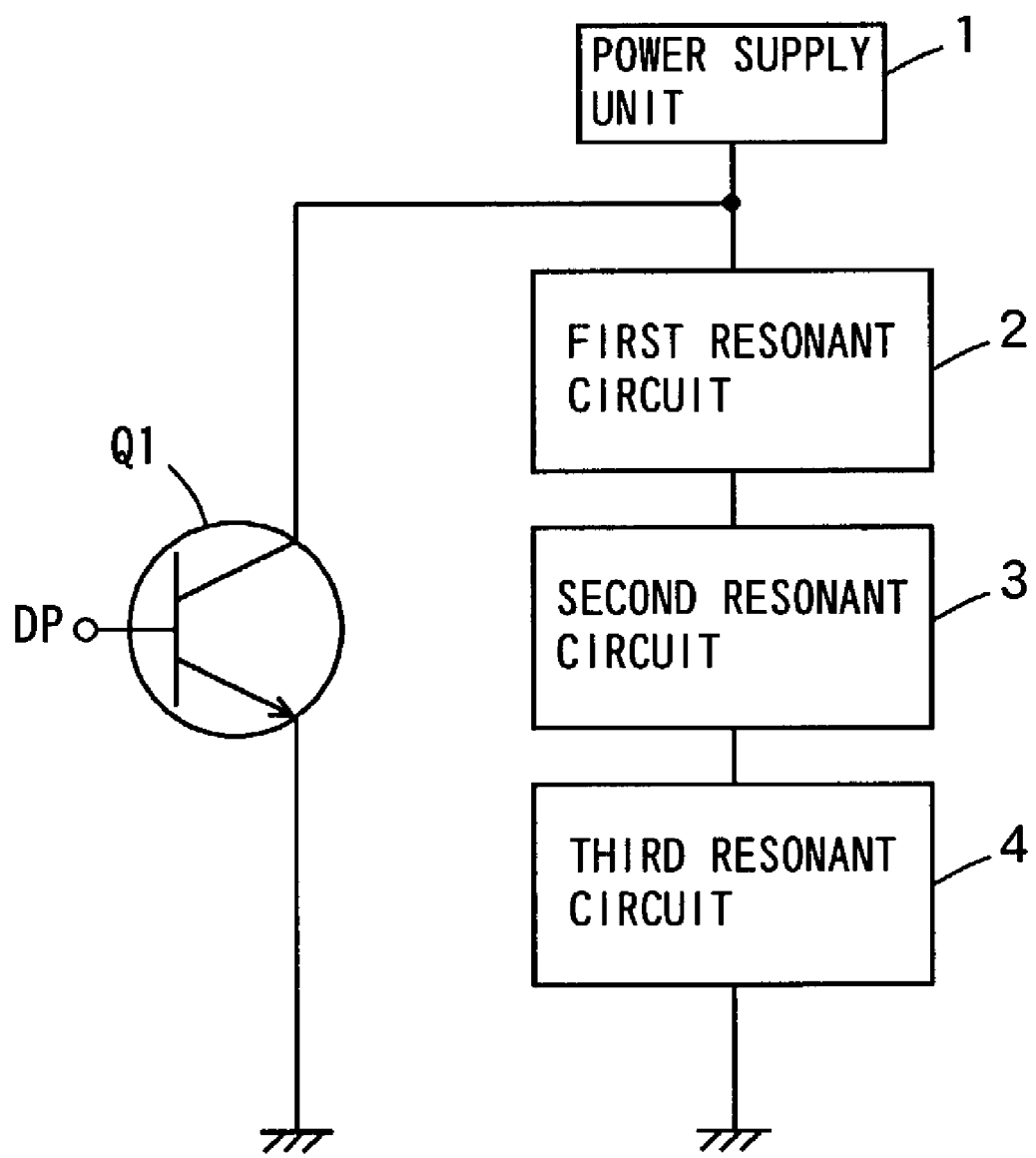
FIG. 1 is a block diagram showing the configuration of a horizontal deflection circuit according to a first embodiment of the present invention.

FIG. 1 is a block diagram showing the configuration of a horizontal deflection circuit according to a first embodiment of the present invention.

The horizontal deflection circuit shown in FIG. 1 comprises a horizontal switching transistor (hereinafter referred to as a transistor) Q1, a power supply unit 1, a first resonant circuit 2, a second resonant circuit 3, and a third resonant circuit 4.

The transistor Q1 has its collector connected to the power supply unit 1 and the first resonant circuit 2, its emitted connected to a ground, and its base to which a drive pulse DP which is synchronized with the horizontal frequency of a video signal displayed on the television receiver is applied.

The first resonant circuit 2 comprises a horizontal deflection coil, and is connected to the power supply unit 1. The third resonant circuit 4 is connected to a ground terminal. The first resonant circuit 2 and the third resonant circuit 4 constitute a horizontal deflection circuit of a diode modulator type, and the second resonant circuit 3 is inserted between the first resonant circuit 2 and the third resonant circuit 4. Consequently, the first resonant circuit 2, the second resonant circuit 3, and the third resonant circuit 4 are connected in series in this order, and are connected in parallel with the transistor Q1.

The first resonant circuit 2 and the third resonant circuit 4 are supplied with energy from the power supply unit 1, and respectively perform resonance operations in response to a switching operation performed by the transistor Q1, so that a resonant pulse voltage having a positive polarity is applied to the horizontal deflection coil included in the first resonant circuit 2 by the first resonant circuit 2 and the third resonant circuit 4. Further, the second resonant circuit 3 performs a resonance operation in response to the resonance operations performed by the first resonant circuit 2 and the third resonant circuit 4, so that a resonant pulse voltage having a negative polarity which is opposite to that of the resonant pulse voltage applied by the first resonant circuit 2 and the third resonant circuit 4 is applied to the horizontal deflection coil in the first resonant circuit 2 by the second resonant circuit 3.

Consequently, a pulse voltage obtained by adding the resonant pulse voltage having a positive polarity by the first resonant circuit 2 and the third resonant circuit 4 and the resonant pulse voltage having a negative polarity by the second resonant circuit 3 is applied to the horizontal deflection coil, so that a pulse voltage greater than the resonant pulse voltage having a positive polarity by the first resonant circuit 2 and the third resonant circuit 4 is applied to the horizontal deflection coil. At this time, the resonant pulse voltage having a negative polarity by the second resonant circuit 3 is not applied to the transistor Q1, and only the resonant pulse voltage having a positive polarity by the first resonant circuit 2 and the third resonant circuit 4 is applied thereto. Accordingly, a pulse voltage smaller than the pulse voltage applied to the horizontal deflection coil is applied to the transistor Q1.

Figure 2:
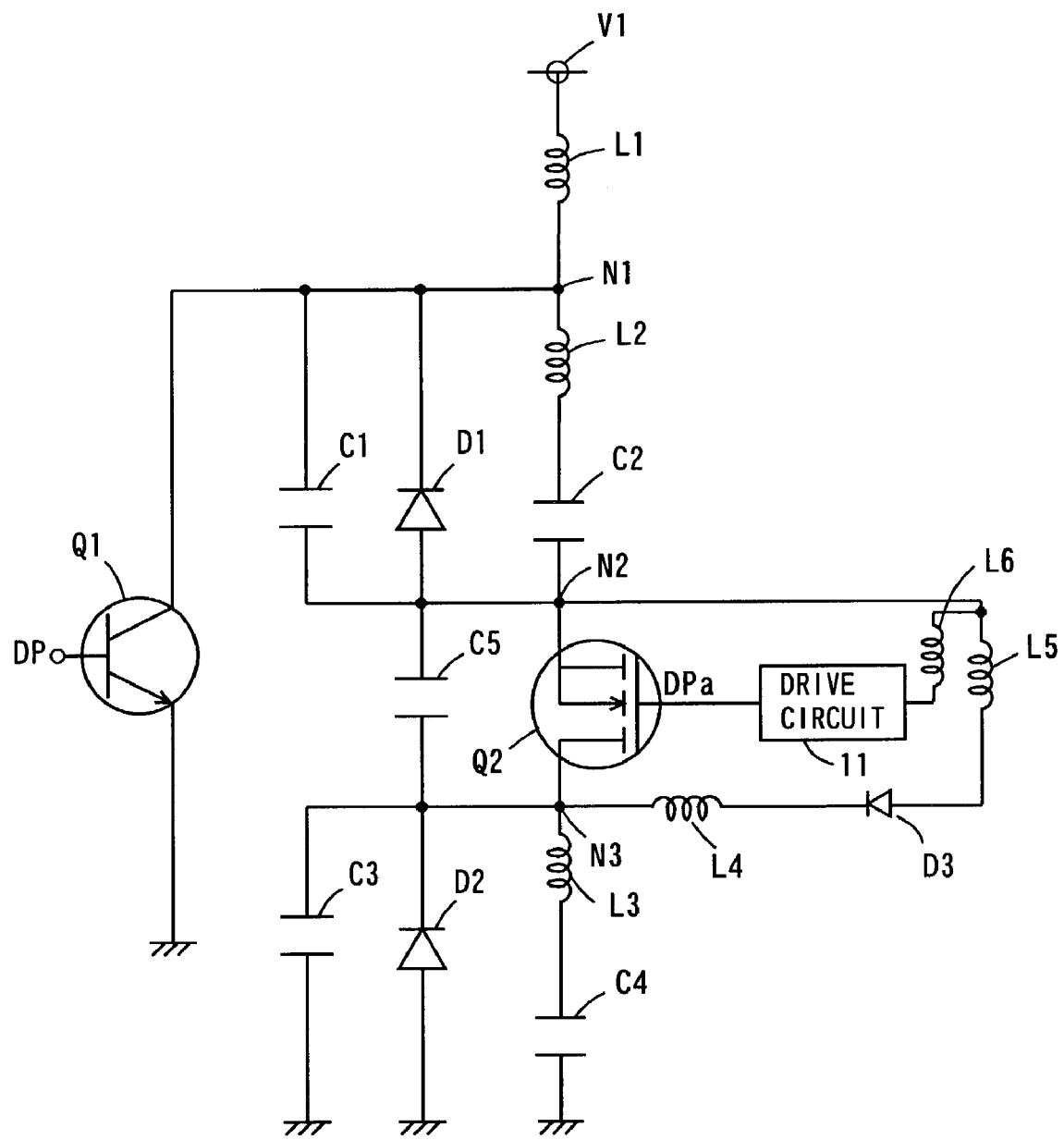
FIG. 2 is a circuit diagram showing the configuration of the horizontal deflection circuit shown in FIG. 1.

FIG. 2 is a circuit diagram showing the configuration of the horizontal deflection circuit shown in FIG. 1. The horizontal deflection circuit shown in FIG. 2 comprises a transistor Q1, resonant capacitors C1 and C3, damper diodes D1 and D2, a primary coil L1 of a deflection transformer, a horizontal deflection coil L2, a resonant coil L3, S-correction capacitors C2 and C4, a resonant capacitor C5, an FET (Field Effect Transistor; hereinafter abbreviated as a transistor) Q2, first and second coils L5 and L6 on the secondary side of the deflection transformer, a smoothing choke coil L4, a smoothing diode D3, and a drive circuit 11.

One end of the primary coil L1 of the deflection transformer is connected to a power supply V1, and the other end thereof is connected to a node N1. The power supply V1 and the primary coil L1 of the deflection transformer constitute the power supply unit 1 shown in FIG. 1. The transistor Q1 is the transistor Q1 shown in FIG. 1, and has its collector connected to the node N1.

The resonant capacitor C1 and the damper diode D1 are connected in parallel between the node N1 and a node N2. The horizontal deflection coil L2 and the S-correction capacitor C2 are connected in series between the node N1 and the node N2. The resonant capacitor C1, the damper diode D1, the horizontal deflection coil L2, and the S-correction capacitor C2 constitute the first resonant circuit 2 shown in FIG. 1.

The resonant capacitor C5 is connected in parallel between the node N2 and a node N3. The transistor Q2 has its source connected to the node N2, its drain connected to the node N3, and its gate connected to the drive circuit 11. The transistor Q2 is not particularly limited to the FET. Another transistor may be used as the transistor Q2. For example, an insulation gate-type bipolar transistor (IGBT) that is a device constructed as one chip by combining an MOS (Metal Oxide Semiconductor) FET and a bipolar transistor may be used.

One end of the smoothing choke coil L4 is connected to the node N3, and the other end thereof is connected to the cathode of the smoothing diode D3. Respective one ends of the first and second coils L5 and L6 on the secondary side of the deflection transformer are connected to the node N2. The other end of the first coil L5 is connected to the anode of the smoothing diode D3. The other end of the second coil L6 is connected to the drive circuit 11.

The first and second coils L5 and L6 are electromagnetically coupled to the primary coil L1 of the deflection transformer. A pulse voltage having a negative polarity is induced in the first and second coils L5 and L6 by the resonant pulse voltage having a positive polarity generated by the first resonant circuit 2.

At this time, a voltage smoothed by the smoothing diode D3 and the smoothing choke coil L4 is applied to the source of the transistor Q2 as a power supply voltage for the transistor Q2 from the pulse voltage having a negative polarity in the first coil L5.

The pulse voltage having a negative polarity induced in the second coil L6 is converted into a predetermined drive pulse DPa by the drive circuit 11, and the drive pulse DPa is supplied to the gate of the transistor Q2, so that the transistor Q2 is turned on/off in response to the drive pulse DPa.

The resonant capacitor C5, the transistor Q2, the smoothing choke coil L4, the smoothing diode D3, the first and second coils L5 and L6 on the secondary side of the deflection transformer, and the drive circuit 11, described above, constitute the second resonant circuit 3 shown in FIG. 1.

The resonant capacitor C3 and the damper diode D2 are connected in parallel between the node N3 and a ground terminal. The resonant coil L3 and the S-correction capacitor C4 are connected in series between the node N3 and the ground terminal. The resonant capacitor C3, the damper diode D2, the resonant coil L3, and the S-correction capacitor C4 constitute the third resonant circuit 4 shown in FIG. 1.

In the present embodiment, the first resonant circuit 2 corresponds to first resonant means, the second resonant circuit 3 corresponds to second resonant means, the third resonant circuit 4 corresponds to third resonant means, the transistor Q1 corresponds to switching means, and the drive circuit 11 corresponds to drive means. The primary coil L1 of the deflection transformer corresponds to a first coil of the deflection transformer, the first coil L5 on the secondary side of the deflection transformer corresponds to a second coil of the deflection transformer, the second coil L6 on the secondary side of the deflection transformer corresponds to a third coil of the deflection transformer, and the transistor Q2 corresponds to a switching device or a first switching device.

Figure 3:
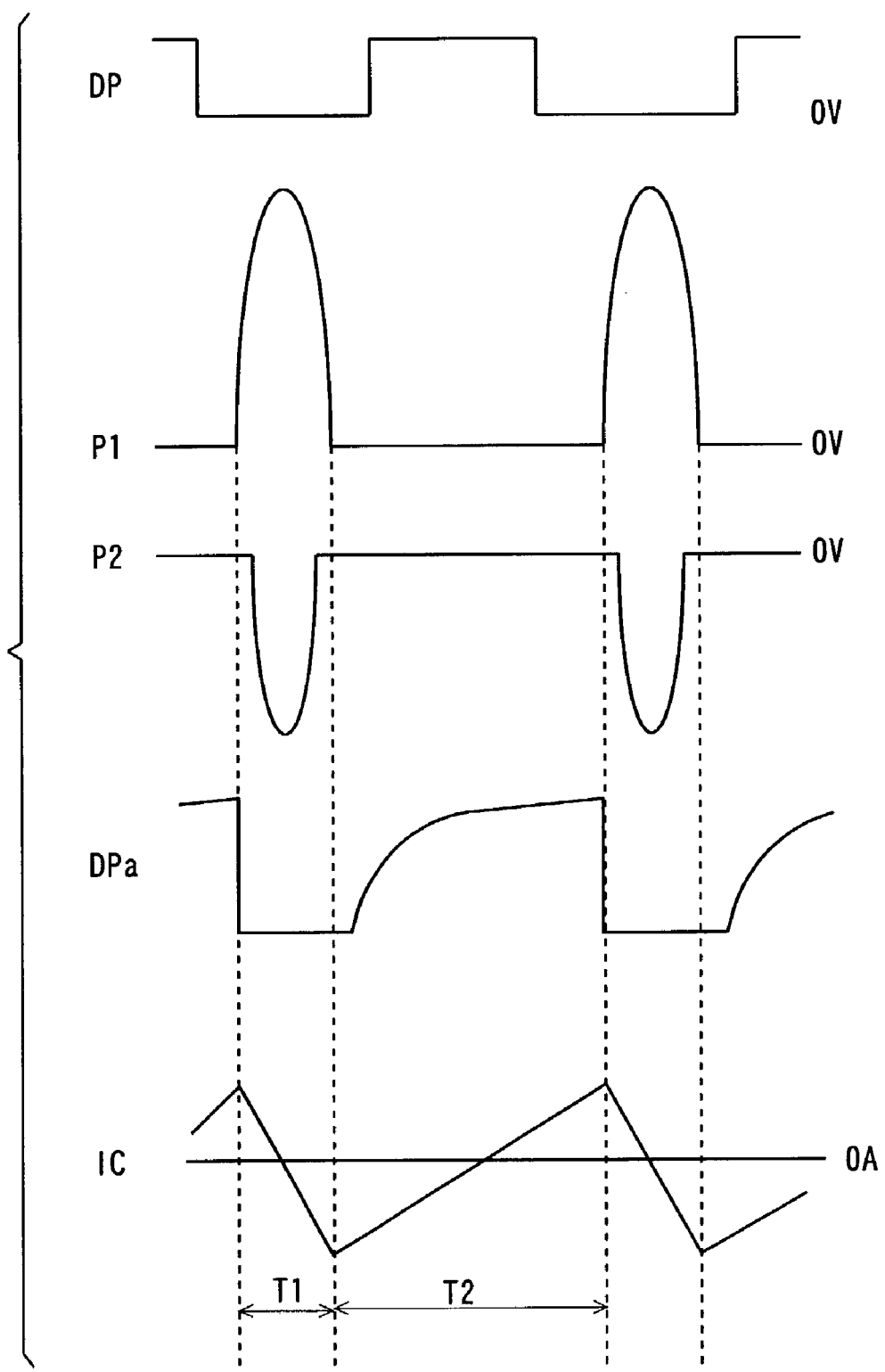
FIG. 3 is a timing chart for explaining the operations of the horizontal deflection circuit shown in FIG. 2.

The operations of the horizontal deflection circuit constructed as described above will be described. FIG. 3 is a timing chart for explaining the operations of the horizontal deflection circuit shown in FIG. 2. Operations other than operations described below are the same as those of the normal horizontal deflection circuit of a diode modulator type and hence, the detailed description thereof is not repeated.

As shown in FIG. 3, when the transistor Q1 is first rendered conductive (an ON period T2 shown in FIG. 3) upon application of a drive pulse DP which is synchronized with the horizontal frequency to the base of the transistor Q1, the first and second resonant circuits 2 and 3 are supplied with energy from the power supply V1 through the primary coil L1 of the deflection transformer, so that a deflection current IC having a predetermined slope flows through the horizontal deflection coil L2.

When the transistor Q1 is then rendered non-conductive (an OFF period T1 shown in FIG. 3), the first and third resonant circuits 2 and 4 perform resonance operations, so that a resonant pulse voltage P1 having a positive polarity is generated at both ends of the horizontal deflection coil L2.

A pulse voltage having a negative polarity is induced in the first and second coils L5 and L6 on the secondary side from the primary coil L1 of the deflection transformer by the resonant pulse voltage having a positive polarity. The pulse voltage having a negative polarity induced in the first coil L5 is smoothed by the smoothing diode D3 and the smoothing choke coil L4, and is applied to the drain of the transistor Q2 as a power supply voltage for the transistor Q2.

Furthermore, the pulse voltage having a negative polarity induced in the second coil L6 is converted into a drive pulse DPa by the drive circuit 11, and the drive pulse DPa obtained by the conversion is applied to the gate of the transistor Q2. Consequently, the drive pulse DPa is applied to the transistor Q2 in synchronization with the resonance operation performed by the first resonant circuit 2, and the transistor Q2 performs a switching operation in synchronization with the switching operation performed by the transistor Q1.

In such a manner, the second resonant circuit 3 performs the resonance operation in synchronization with the resonance operations performed by the first resonant circuit 2 and the third resonant circuit 4, so that the resonant pulse voltage P1 having a positive polarity is applied to the horizontal deflection coil L2 by the first resonant circuit 2 and the third resonant circuit 4, and a resonant pulse voltage P2 having a negative polarity is applied thereto by the second resonant circuit 3.

Here, the resonance operation by the second resonant circuit 3 occurs after the resonance operations by the first and third resonant circuits 2 and 4. The drive pulse DPa for driving the transistor Q2 is generated on the basis of a voltage from the second coil L6 such that it enters a low level in the OFF period T1, while entering a high level in the ON period T2. The resonance operation by the second resonant circuit 3 occurs in response to the drive pulse DPa. Accordingly, the pulse width of the resonant pulse voltage P2 having a negative polarity is narrower than the pulse width of the resonant pulse voltage P1 having a positive polarity, as shown in FIG. 3.

Consequently, the period becomes a margin of the resonant pulse voltage P2 having a negative polarity with the resonant pulse voltage P1 having a positive polarity, thereby making it possible to stably generate the resonant pulse voltage P2 having a negative polarity with respect to the resonant pulse voltage P1 having a positive polarity. The waveform of the resonant pulse voltage P2 having a negative polarity is not particularly limited to the above-mentioned example. Various changes can be made. For example, the pulse width of the resonant pulse voltage P2 having a negative polarity may be made equal to the pulse width of the resonant pulse voltage P1 having a positive polarity.

In such a manner, the resonant pulse voltage P2 having a negative polarity by the second resonant circuit 3 is applied, in addition to the resonant pulse voltage P1 having a positive polarity by the first and third resonant circuits 2 and 4, to the horizontal deflection coil L2. Accordingly, a pulse voltage greater than the resonant pulse voltage P1 can be applied thereto.

At this time, the resonant pulse voltage P2 having a negative polarity by the second resonant circuit 3 becomes a reference voltage on the side of the cathode of the damper diode D2 in the third resonant circuit 4. Accordingly, the resonant pulse voltage P2 having a negative polarity by the second resonant circuit 3 is not applied to the transistor Q1, and only the resonant pulse voltage P1 having a positive polarity by the first resonant circuit 2 and the third resonant circuit 4 is applied thereto.

Therefore, a pulse voltage higher than the resonant pulse voltage P1 is applied to the horizontal deflection coil L2 by the first to third resonant circuits 2, 3, and 4, and only a resonant pulse voltage P1 lower than the pulse voltage applied to the horizontal deflection coil L2 is applied to the transistor Q1 by the first resonant circuit 2 and the third resonant circuit 4. Accordingly, a pulse voltage higher than the voltage resistance of the transistor Q1 can be applied to the horizontal deflection coil L2.

In such a manner, in the present embodiment, the pulse voltage applied to the horizontal deflection coil L2 can be increased without being limited by the voltage resistance of the transistor Q1. Accordingly, the inductance value of the horizontal deflection coil L2 is increased, thereby making it possible to improve the optical characteristics and the distortion characteristics of the cathode-ray tube. Further, the inductance value of the horizontal deflection coil L2 can be increased, thereby making it possible to reduce a deflection current flowing through the horizontal deflection coil L2 to reduce power consumption.

The first and third resonant circuits 2 and 4 constitute a horizontal deflection circuit of a diode modulator type. Accordingly, a current in the S-correction capacitor C4 in the third resonant circuit 4 is modulated, thereby making it possible to also correct pincushion distortion without varying a high voltage output generated by the deflection transformer.

Figure 4:
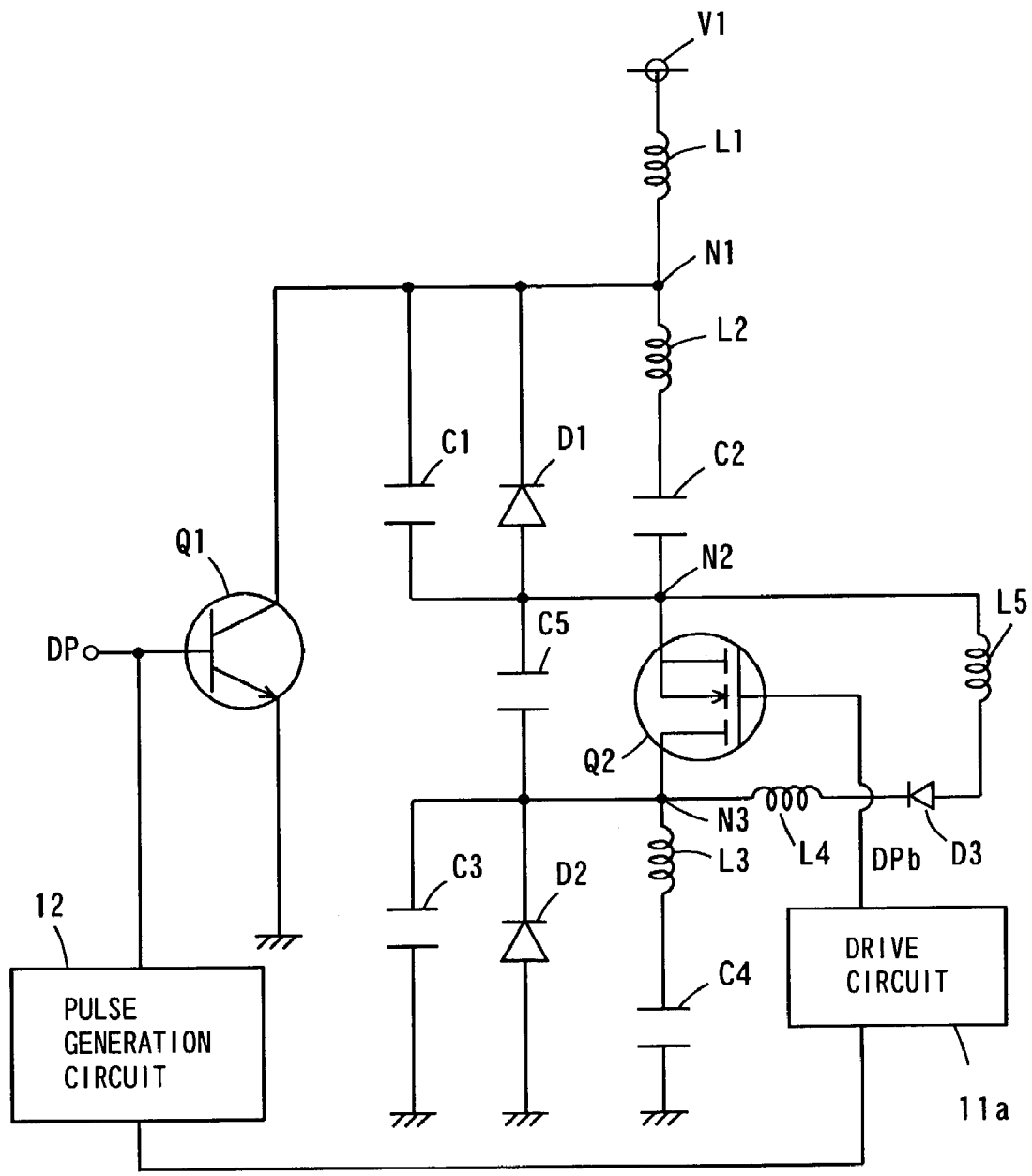
FIG. 4 is a circuit diagram showing the configuration of a horizontal deflection circuit according to a second embodiment of the present invention.
Figure 5:
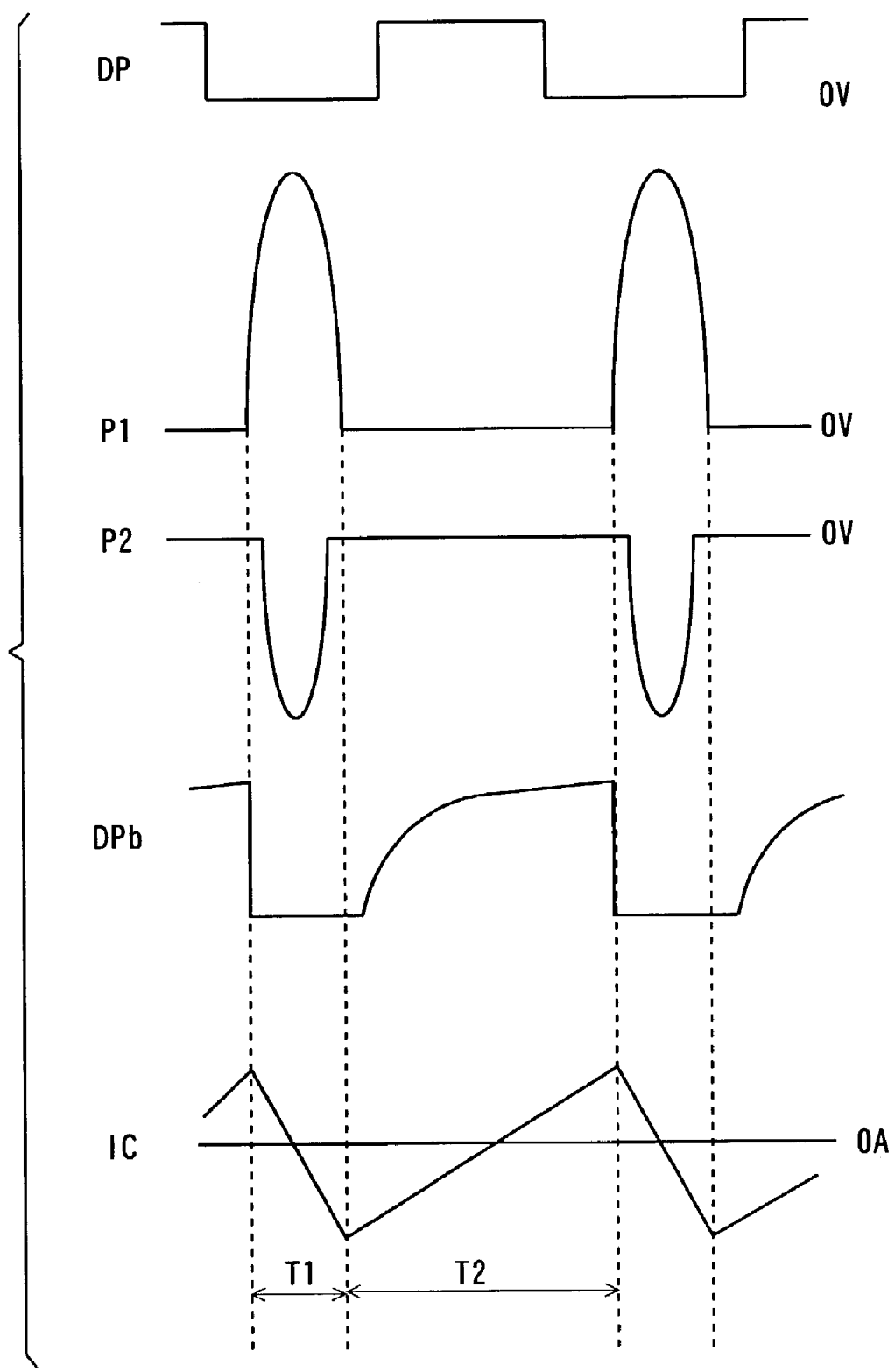
FIG. 5 is a timing chart for explaining the operations of the horizontal deflection circuit shown in FIG. 4.

A horizontal deflection circuit according to a second embodiment of the present invention will be described. FIG. 4 is a circuit diagram showing the configuration of a horizontal deflection circuit according to the second embodiment of the present invention. FIG. 5 is a timing chart for explaining the operations of the horizontal deflection circuit shown in FIG. 4.

The horizontal deflection circuit shown in FIG. 4 is the same as the horizontal deflection circuit shown in FIG. 2 except that the drive circuit 11 and the second coil L6 on the secondary side of the deflection transformer are omitted, and a pulse generation circuit 12 and a drive circuit 11a are added. Accordingly, the same portions are assigned the same reference numerals and hence, the detailed description thereof is omitted.

As shown in FIG. 4, the pulse generation circuit 12 receives a drive pulse DP, and outputs to the drive circuit 11a a drive signal which is synchronized with the drive pulse DP and has a period of a low level and an a period of a high level which are respectively narrower and wider than those of the drive pulse DP, that is, respectively enters a low level and a high level in an OFF period T1 and an ON period T2 shown in FIG. 5. The drive circuit 11a applies a drive pulse DPb which is changed in response to the drive signal outputted from the pulse generation circuit 12 to the gate of a transistor Q2.

The present embodiment is the same as the first embodiment except that a resonant capacitor C5, the transistor Q2, a smoothing choke coil L4, a smoothing diode D3, a first coil L5 on the secondary side of a deflection transformer, the pulse generation circuit 12, and the drive circuit 11a constitute a second resonant circuit.

In the above-mentioned manner, the horizontal deflection circuit shown in FIG. 4 also operates, similarly to the horizontal deflection circuit shown in FIG. 2. The second resonant circuit can apply a resonant pulse voltage P2 having a negative polarity to a horizontal deflection coil L2 in synchronization with a resonant pulse voltage P1 having a positive polarity by first and third resonant circuits.

At this time, a reference potential in the drive circuit 11a is set to a potential on the side of the cathode of a damper diode D2 in the third resonant circuit 4. Consequently, the resonant pulse voltage P2 having a negative polarity generated when the transistor Q2 driven by the drive circuit 11a is rendered non-conductive is applied to only the horizontal deflection coil L2, and is not applied to a transistor Q1. Also in the present embodiment, the horizontal deflection circuit can thus operate, similarly to that in the first embodiment, thereby making it possible to obtain the same effect.

Although in the present embodiment, the drive pulse DPb for driving the transistor Q2 is produced using the drive pulse DP for the transistor Q1, the drive pulse for driving the transistor Q2 is not particularly limited to that in the above-mentioned example, provided that it is a drive signal which is synchronized with the drive pulse DP. When the drive pulse DP is generated by a microcomputer, for example, a signal which is synchronized with the drive pulse DP may be produced by the microcomputer, to use the signal as the drive pulse for the transistor Q2.

Figure 6:
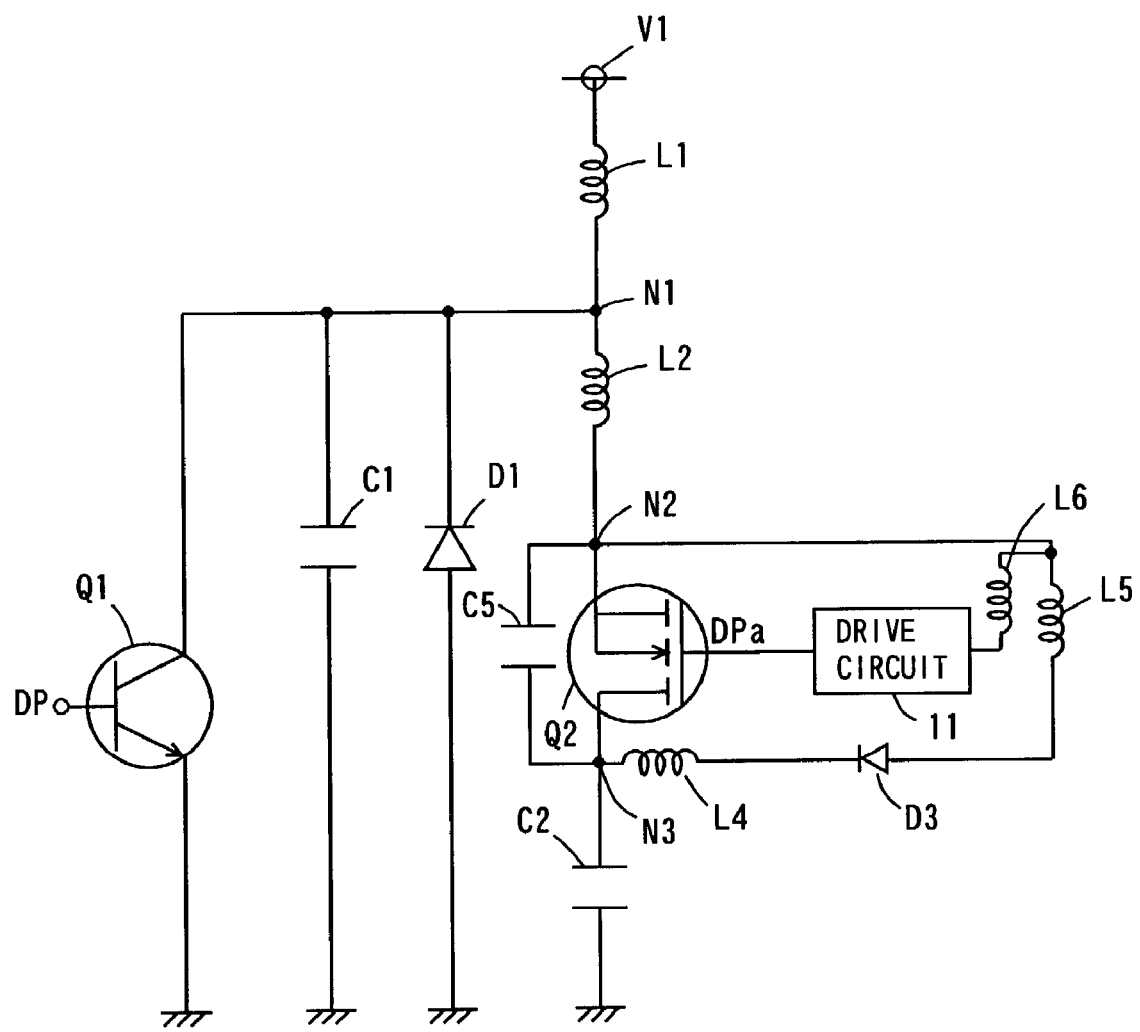
FIG. 6 is a circuit diagram showing the configuration of a horizontal deflection circuit according to a third embodiment of the present invention.

A horizontal deflection circuit according to a third embodiment of the present invention will be described. FIG. 6 is a circuit diagram showing the configuration of the horizontal deflection circuit according to the third embodiment of the present invention.

The horizontal deflection circuit shown in FIG. 6 comprises a horizontal switching transistor (hereinafter referred to as a transistor) Q1, a resonant capacitor C1, a damper diode D1, a primary coil L1 of a deflection transformer, a horizontal deflection coil L2, an S-correction capacitor C2, a resonant capacitor C5, an FET (Field Effect Transistor; hereinafter abbreviated as a transistor) Q2, a smoothing choke coil L4, a smoothing diode D3, first and second coils L5 and L6 on the secondary side of the deflection transformer, and a drive circuit 11.

One end of the primary coil L1 of the deflection transformer is connected to a power supply V1, and the other end thereof is connected to a node N1. The transistor Q1 has its collector connected to the node N1, its emitter connected to a ground, and its base to which a drive pulse DP which is synchronized with the horizontal frequency of a video signal displayed on a television receiver is applied.

The resonant capacitor C1 and the damper diode D1 are connected in parallel between the node N1 and a ground terminal. The horizontal deflection coil L2 is connected between the node N1 and a node N2. The S-correction capacitor C2 is connected between a node N3 and the ground terminal. The resonant capacitor C1, the damper diode D1, the horizontal deflection coil L2, and the S-correction capacitor C2 constitute a first resonant circuit.

The resonant capacitor C5 is connected between the node N2 and a node N3. The transistor Q2 has its source connected to the node N2, its drain connected to the node N3, and its gate connected to the drive circuit 11. The transistor Q2 is not particularly limited to an FET. Another transistor may be used. For example, an insulation gate type bipolar transistor (IGBT) or the like that is a device constructed as one chip by combining an MOS (Metal Oxide Semiconductor) FET and a bipolar transistor may be used.

One end of the smoothing choke coil L4 is connected to the node N3, and the other end thereof is connected to the cathode of the smoothing diode D3. One end of each of the first and second coils L5 and L6 on the secondary side of the deflection transformer is connected to the node N2. The other end of the first coil L5 is connected to the anode of the smoothing diode D3. The other end of the second coil L6 is connected to the drive circuit 11.

The first and second coils L5 and L6 are electromagnetically coupled to the primary coil L1 of the deflection transformer. A pulse voltage having a negative polarity is induced in the first and second coils L5 and L6 by a resonant pulse voltage having a positive polarity generated by the first resonant circuit.

At this time, a voltage smoothed by the smoothing diode D3 and the smoothing choke coil L4 from the pulse voltage having a negative polarity in the first coil L5 is applied to the source of the transistor Q2 as a power supply voltage for the transistor Q2.

Furthermore, the pulse voltage having a negative polarity induced in the second coil L6 is converted into a predetermined drive pulse DPa by the drive circuit 11, the drive pulse DPa is supplied to the gate of the transistor Q2, and the transistor Q2 is turned on/off in response to the drive pulse DPa.

The resonant capacitor C5, the transistor Q2, the smoothing choke coil L4, the smoothing diode D3, the first and second coils L5 and L6 on the secondary side of the deflection transformer, and the drive circuit 11, described above, constitute a second resonant circuit.

In the present embodiment, the resonant capacitor C1, the damper diode D1, the horizontal deflection coil L2, and the S-correction capacitor C2 correspond to first resonant means, the resonant capacitor C5, the transistor Q2, the smoothing choke coil L4, the smoothing diode D3, the first and second coils L5 and L6 on the secondary side of the deflection transformer, and the drive circuit 11 correspond to second resonant means, the transistor Q1 corresponds to switching means, and the drive circuit 11 corresponds to drive means. Further, the primary coil L1 of the deflection transformer corresponds to a first coil of the deflection transformer, the first coil L5 on the secondary side of the deflection transformer corresponds to a second coil of the deflection transformer, the second coil L6 on the secondary side of the deflection transformer corresponds to a third coil of the deflection transformer, and the transistor Q2 corresponds to a switching device.

The operations of the horizontal deflection circuit constructed as described above will be described. FIG. 7 is a timing chart for explaining the operations of the horizontal deflection circuit shown in FIG. 6. Operations other than operations described below are the same as those of the normal horizontal deflection circuit and hence, the detailed description is omitted.

As shown in FIG. 7, when the transistor Q1 is rendered conductive (an OFF period T2 shown in FIG. 7) upon application of a drive pulse DP which is synchronized with the horizontal frequency to the base of the transistor Q1, the first resonant circuit is supplied with energy from the power supply V1 through the primary coil L1 of the deflection transformer, so that a deflection current IC having a predetermined slope flows through the horizontal deflection coil L2.

When the transistor Q1 is then rendered non-conductive (an OFF period T1 shown in FIG. 7), the first resonant circuit performs a resonance operation, so that a resonant pulse voltage P1 having a positive polarity is generated at both ends of the horizontal deflection coil L2.

A pulse voltage having a negative polarity is induced in the first and second coils L5 and L6 on the secondary side from the primary coil L1 of the deflection transformer by the resonant pulse voltage having a positive polarity. The pulse voltage having a negative polarity induced in the first coil L5 is smoothed by the smoothing diode D3 and the smoothing choke coil L4, and is applied to the drain of the transistor Q2 as a power supply voltage for the transistor Q2.

The pulse voltage having a negative polarity induced in the second coil L6 is converted into a drive pulse DPa by the drive circuit 11, and the drive pulse DPa obtained by the conversion is applied to the gate of the transistor Q2. Consequently, the drive pulse DPa is applied to the transistor Q2 in synchronization with the resonance operation performed by the first resonant circuit, and the transistor Q2 performs a switching operation in synchronization with a switching operation performed by the transistor Q1.

In such a manner, the second resonant circuit performs a resonance operation in synchronization with the resonance operation performed by the first resonant circuit. Accordingly, the resonant pulse voltage P1 having a positive polarity is applied to the horizontal deflection coil L2 by the first resonant circuit, and a resonant pulse voltage P2 having a negative polarity is applied thereto by the second resonant circuit. Accordingly, a deflection current IC having a slope in the opposite direction to the predetermined slope flows through the horizontal deflection coil L2.

By repeating the above-mentioned operations, a sawtooth deflection current IC flows through the horizontal deflection coil L2. Consequently, a magnetic field is generated in the horizontal deflection coil L2, thereby making it possible to successively deflect electron beams in the horizontal direction.

The resonance operation by the second resonant circuit occurs after the resonance operation by the first resonant circuit. The drive pulse DPa for driving the transistor Q2 is controlled by the drive circuit 11 so as to enter a low level in the OFF period T1, while entering a high level in the ON period T2. The resonance operation by the second resonant circuit occurs in response to the drive pulse DPa. Accordingly, the pulse width of the resonant pulse voltage P2 having a negative polarity is narrower than the pulse width of the resonant pulse voltage P1 having a positive polarity, as shown in FIG. 7.

Consequently, this period becomes a margin of the resonant pulse voltage P2 having a negative polarity with the resonant pulse voltage P1 having a positive polarity, so that the resonant pulse voltage P2 having a negative polarity can be stably generated with respect to the resonant pulse voltage P1 having a positive polarity. The waveform of the resonant pulse voltage P2 having a negative polarity is not particularly limited to that in the above-mentioned example. Various modifications can be made. For example, the pulse width of the resonant pulse voltage P2 having a negative polarity may be equal to the pulse width of the resonant pulse voltage P1 having a positive polarity.

In such a manner, the resonant pulse voltage P2 having a negative polarity by the second resonant circuit is applied, in addition to the resonant pulse voltage P1 having a positive polarity by the first resonant circuit, to the horizontal deflection coil L2, so that a pulse voltage greater than the resonant pulse voltage P1 can be applied thereto.

At this time, the resonant pulse voltage P2 having a negative polarity by the second resonant circuit becomes a source voltage of the transistor Q2 using a ground potential as a basis. Accordingly, the resonant pulse voltage P2 having a negative polarity by the second resonant circuit is not applied to the transistor Q1, and only the resonant pulse voltage P1 having a positive polarity by the first resonant circuit is applied thereto.

Consequently, a pulse voltage higher than the resonant pulse voltage P1 is applied to the horizontal deflection coil L2 by the first and second resonant circuits, and only a resonant pulse voltage P1 lower than the pulse voltage applied to the horizontal deflection coil L2 is applied to the transistor Q1 by the first resonant circuit, so that a pulse voltage higher than the voltage resistance of the transistor Q1 can be applied to the horizontal deflection coil L2.

In such a manner, in the present embodiment, the pulse voltage applied to the horizontal deflection coil L2 can be increased without being limited by the voltage resistance of the transistor Q1. Accordingly, the inductance value of the horizontal deflection coil L2 is increased, thereby making it possible to improve the optical characteristics and the distortion characteristics of a cathode-ray tube. Further, the inductance value of the horizontal deflection coil L2 can be increased, thereby making it possible to reduce a deflection current flowing through the horizontal deflection coil L2 to reduce power consumption.

Figure 8:
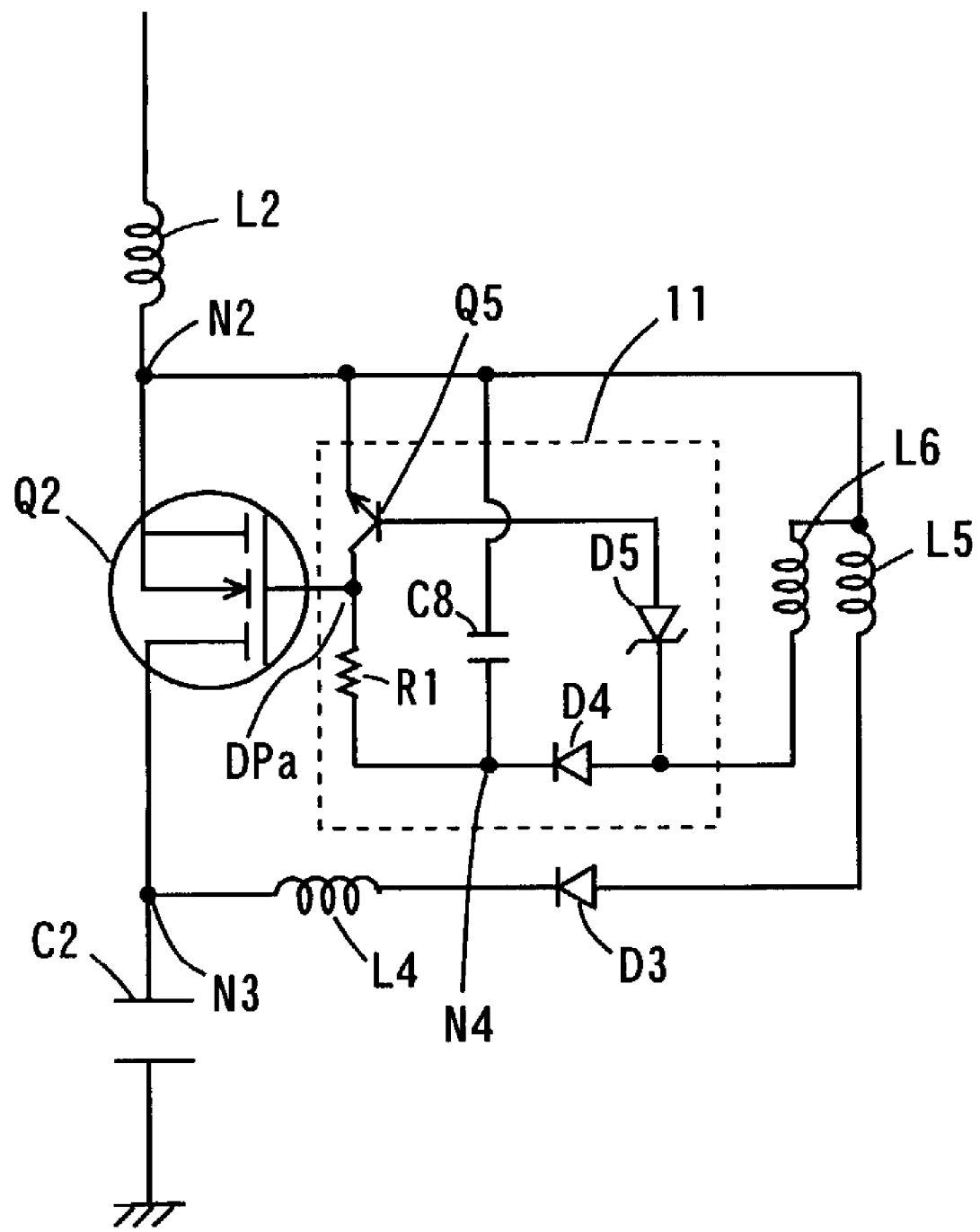
FIG. 8 is a circuit diagram showing the configuration of a drive circuit in the horizontal deflection circuit shown in FIG. 6.
Figure 9:
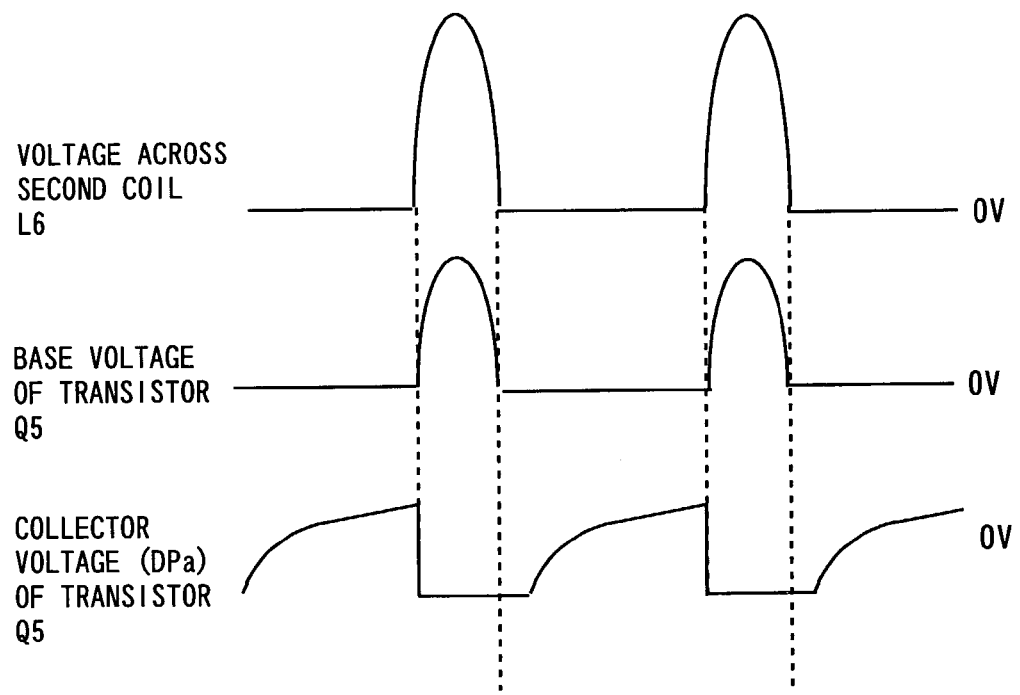
FIG. 9 is a timing chart for explaining the operations of the drive circuit shown in FIG. 8.

FIG. 8 is a circuit diagram showing an example of the configuration of the drive circuit 11 in the horizontal deflection circuit shown in FIG. 6. FIG. 9 is a timing chart for explaining the operations of the drive circuit 11 shown in FIG. 8.

The drive circuit 11 comprises a transistor Q5, a resistor R1, a smoothing capacitor C8, a smoothing diode D4, and a Zener diode D5. The transistor Q5 has its collector connected to the gate of the transistor Q2, its emitter connected to the node N2, and its base connected to the anode of the Zener diode D5. The anode of the smoothing diode D4 and the cathode of the Zener diode D5 are connected to the other end of the second coil L6. The cathode of the smoothing diode D4 is connected to a node N4. The smoothing capacitor C8 is connected between the node N2 and the node N4, and the resistor R1 is connected between the gate of the transistor Q2 and the node N4.

A voltage induced in the second coil L6 is smoothed by the smoothing diode D4 and the smoothing capacitor C8, so that a power supply voltage for driving the transistor Q5 is produced, and is supplied to the transistor Q5 through the resistor R1. Further, the voltage induced in the second coil L6 is shifted in a direct-current manner by the Zener diode D5, and is applied to the base of the transistor Q5 such that the transistor Q5 is driven at the timing of a pulse of the voltage induced in the second coil L6. Consequently, a drive voltage DPa having a waveform obtained by reversing a base voltage from the collector of the transistor Q5 is outputted. The transistor Q2 is driven by the drive voltage DPa.

In the horizontal deflection circuit in the third embodiment, the operations thereof may, in some cases, be unstable when a power supply is started in a state where the degree of coupling between the coil L1 on the primary side of the deflection transformer and the first and second coils L5 and L6 on the secondary side is low. The horizontal deflection circuit described below is a system for stabilizing the operations at the time of starting the power supply.

Figure 10:
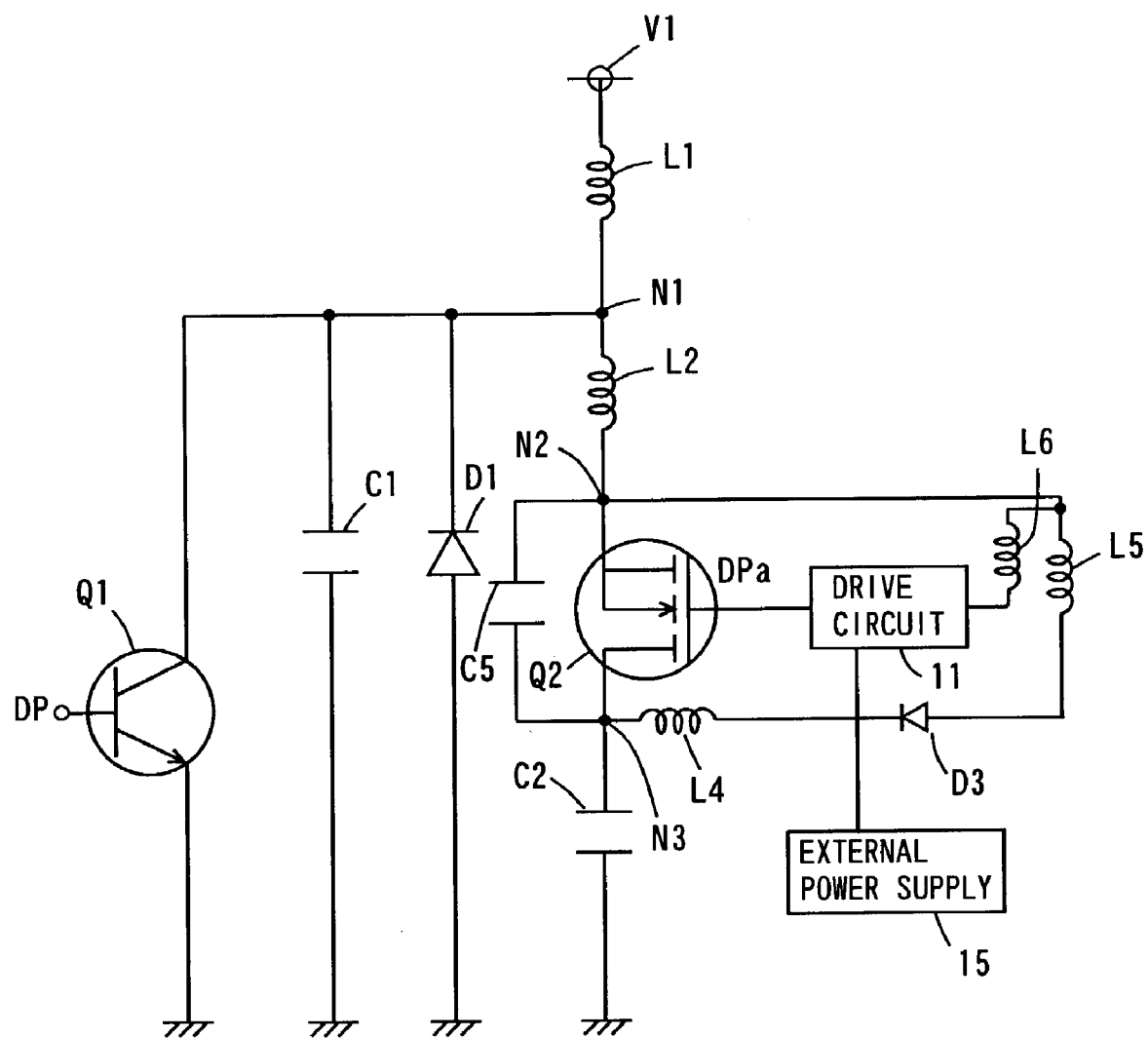
FIG. 10 is a circuit diagram showing the configuration of a horizontal deflection circuit according to a fourth embodiment of the present invention.

FIG. 10 is a block diagram showing the configuration of a horizontal deflection circuit according to a fourth embodiment of the present invention. FIG. 12(a) is a timing chart for explaining the operations of the horizontal deflection circuit shown in FIG. 10. The horizontal deflection circuit in the fourth embodiment is a horizontal deflection circuit using an external power supply system.

The horizontal deflection circuit shown in FIG. 10 is the same as the horizontal deflection circuit shown in FIG. 6 except that an external power supply 15 is connected to the drive circuit 11. The configuration of the remainder of the horizontal deflection circuit shown in FIG. 10 is the same as the configuration of the horizontal deflection circuit shown in FIG. 6. The operations at the stationary time of the horizontal deflection circuit shown in FIG. 10 are the same as the operations shown in FIG. 7.

In the horizontal deflection circuit shown in FIG. 10, a drive voltage is supplied to a transistor Q2 from the external power supply 15 before a drive voltage supplied to the transistor Q2 from the drive circuit 11 rises on the basis of a voltage induced in a second coil L6 when a power supply V1 is started.

In the horizontal deflection circuit shown in FIG. 10, a resonant capacitor C1, a damper diode D1, a horizontal deflection coil L2, and an S-correction capacitor C2 constitute a first resonant circuit, as in the third embodiment. The first resonant circuit operates, similarly to the first resonant circuit in the third embodiment, so that a resonant pulse voltage having a positive polarity is applied to the horizontal deflection coil L2.

Furthermore, a resonant capacitor C5, a transistor Q2, a smoothing choke coil L4, a smoothing diode D3, first and second coils L5 and L6 on the secondary side of a deflection transformer, and the drive circuit 11 constitute a second resonant circuit. The second resonant circuit operates, similarly to the second resonant circuit in the third embodiment, so that a resonant pulse voltage having a negative polarity is applied to the horizontal deflection coil L2.

In such a manner, a resonant pulse voltage having a negative polarity by the second resonant circuit is applied, in addition to a resonant pulse voltage having a positive polarity by the first resonant circuit, to the horizontal deflection coil L2, so that a greater pulse voltage can be applied thereto. At this time, the resonant pulse voltage having a negative polarity by the second resonant circuit is not applied to the transistor Q1, and only the resonant pulse voltage having a positive polarity by the first resonant circuit is applied thereto.

Consequently, also in the present embodiment, the pulse voltage applied to the horizontal deflection coil L2 can be increased without being limited by the voltage resistance of the transistor Q1. Accordingly, the same effect as that in the first embodiment can be obtained.

Here, before the first resonant circuit starts a resonance operation upon application of a voltage to a primary coil L1 of the deflection transformer by application of a drive pulse DP to the base of the transistor Q1, a drive voltage is supplied to the transistor Q2 from the external power supply 15. That is, the external power supply 15 supplies a drive voltage to the gate of the transistor Q2 before the first resonant circuit performs the resonance operation. Consequently, a sufficient drive voltage can be supplied to the second resonant circuit before the first resonant circuit starts the resonance operation, thereby making it possible for the second resonant circuit to stably perform a resonance operation.

In the present embodiment, the external power supply 15 corresponds to voltage supply means.

FIG. 11 is a circuit diagram showing an example of the configuration of the drive circuit 11 and the external power supply 15 in the horizontal deflection circuit shown in FIG. 10. FIG. 12($b$) is a timing chart for explaining the operations at the time of starting a power supply for the drive circuit 11 shown in FIG. 11.

The configuration of the drive circuit 11 shown in FIG. 11 is the same as the configuration of the drive circuit 11 shown in FIG. 8. The external power supply 15 shown in FIG. 11 comprises a winding L7, a smoothing diode D6, a smoothing capacitor C9, and a reverse flow preventing diode D7.

One end of the winding L7 is connected to a node N2, and is set as a floating power supply using the source of the transistor Q2 as a basis. The other end of the winding L7 is connected to the anode of the smoothing diode D6, and the cathode of the smoothing diode D6 is connected to the anode of the reverse flow preventing diode D7. The cathode of the reverse flow preventing diode D7 is connected to a node N4. The smoothing capacitor C9 is connected between one end of the winding L7 and the cathode of the smoothing diode D6.

As shown in FIG. 12($b$), a voltage in the winding L7 is set so as to rise a predetermined time period before a voltage induced in the second coil L6 rises. The voltage in the winding L7 is smoothed by the smoothing diode D6 and the smoothing capacitor C9. The smoothed voltage is supplied to the node N4 through the reverse flow preventing diode D7, and is further supplied as a drive voltage to the gate of the transistor Q2 through a resistor R1.

Consequently, a sufficient drive voltage can be supplied to the second resonant circuit before the first resonant circuit starts the resonance operation, thereby making it possible for the second resonant circuit to stably perform the resonance operation.

Figure 13:
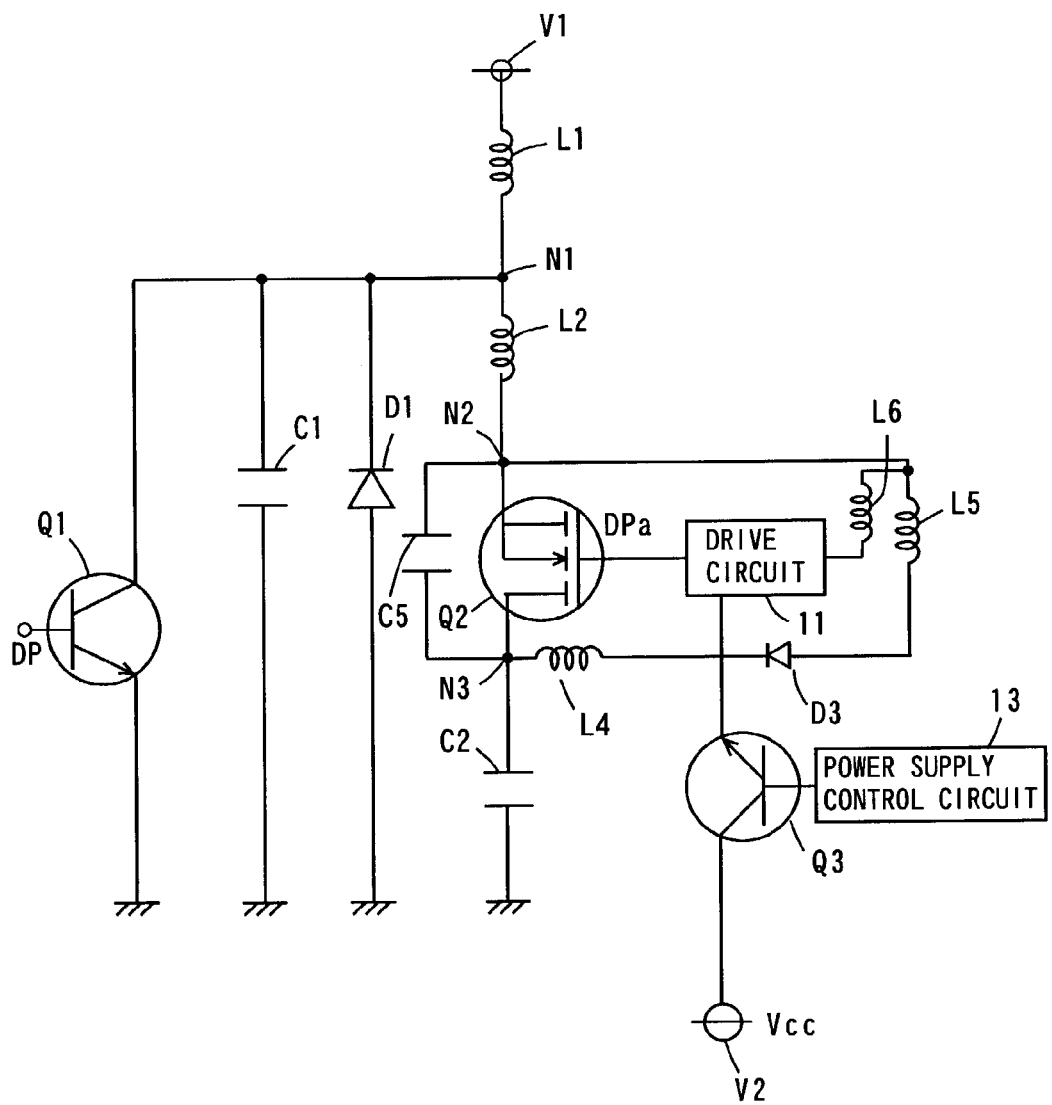
FIG. 13 is a circuit diagram showing the configuration of a horizontal deflection circuit according to a fifth embodiment of the present invention.

FIG. 13 is a block diagram showing the configuration of a horizontal deflection circuit according to a fifth embodiment of the present invention. The horizontal deflection circuit in the fifth embodiment is a horizontal deflection circuit using a power supply switching system.

The horizontal deflection circuit shown in FIG. 13 differs from the horizontal deflection circuit shown in FIG. 6 in that a switching transistor Q3 and a power supply control circuit 13 are further provided.

The switching transistor Q3 has its collector connected to a DC power supply V2 used for another circuit in a television receiver. The DC power supply V2 supplies a power supply voltage $V_{cc}$. The switching transistor Q3 has its emitter connected to a drive circuit 11, and its base connected to the power supply control circuit 13. The configuration of the remainder of the horizontal deflection circuit shown in FIG. 13 is the same as the configuration of the horizontal deflection circuit shown in FIG. 6. The operations at the stationary time of the horizontal deflection circuit shown in FIG. 13 are the same as the operations shown in FIG. 7.

The power supply control circuit 13 controls the switching transistor Q3 so as to supply the power supply voltage $V_{cc}$ from the DC power supply V2 as a drive voltage for a transistor Q2 only until a second resonant circuit operates in a state where a first resonant circuit has not operated yet when a power supply V1 is started.

Consequently, a sufficient drive voltage can be supplied to a second resonant circuit before the first resonant circuit starts a resonance operation, thereby making it possible for the second resonant circuit to stably perform a resonance operation.

The drive voltage is supplied to the transistor Q2 by the power supply control circuit 13 until the second resonant circuit starts the resonance operation. Accordingly, the second resonant circuit can stably operate without being affected by the resonance operation performed by the first resonant circuit. Accordingly, the circuit operation can be stably performed as a high voltage horizontal deflection circuit.

In the present embodiment, the switching transistor Q3 and the power supply control circuit 13 correspond to voltage supply means, and the switching transistor Q3 corresponds to a second switching device.

Figure 14:
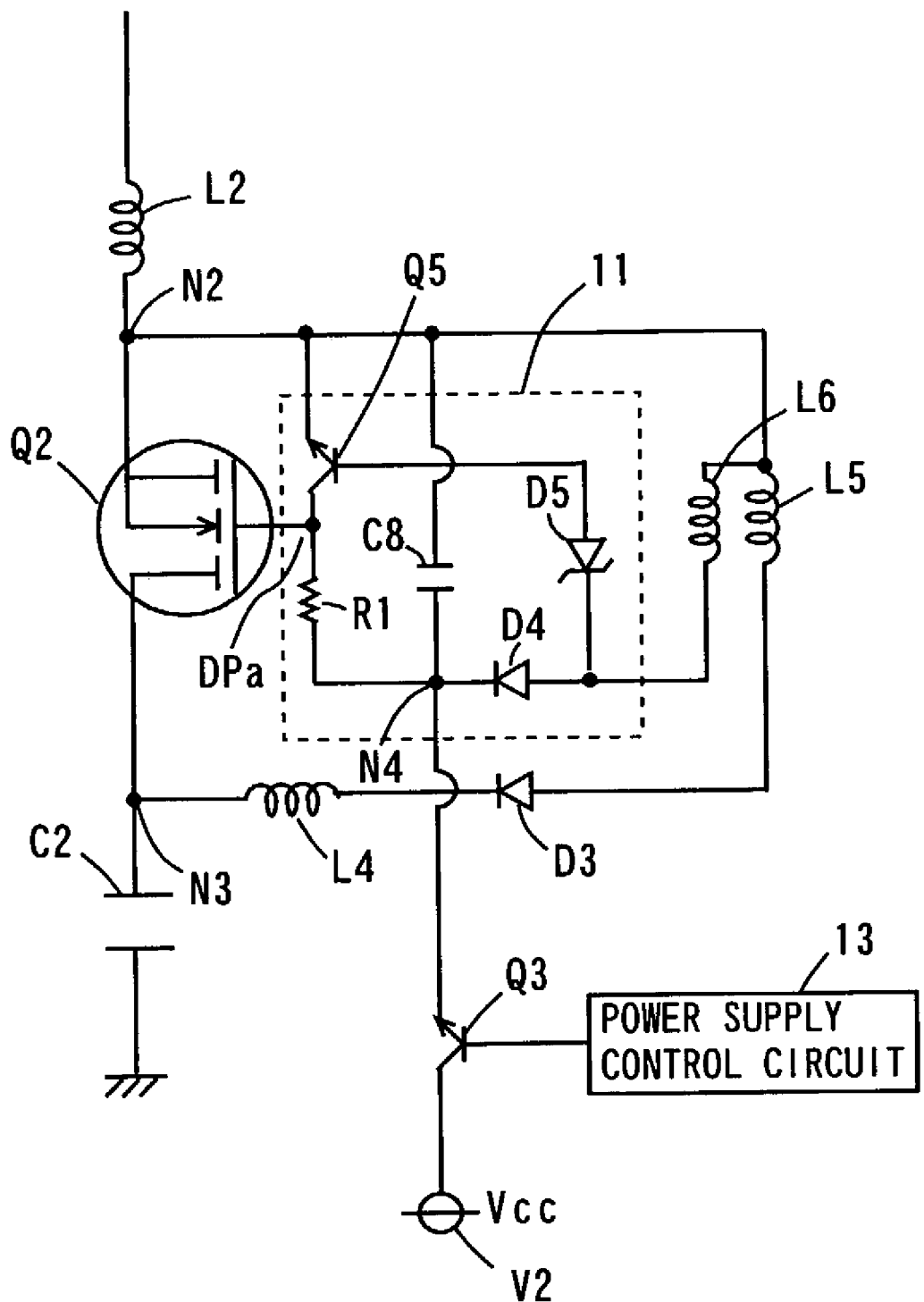
FIG. 14 is a circuit diagram showing an example of the configuration of a drive circuit in the horizontal deflection circuit shown in FIG. 13.
Figure 15:
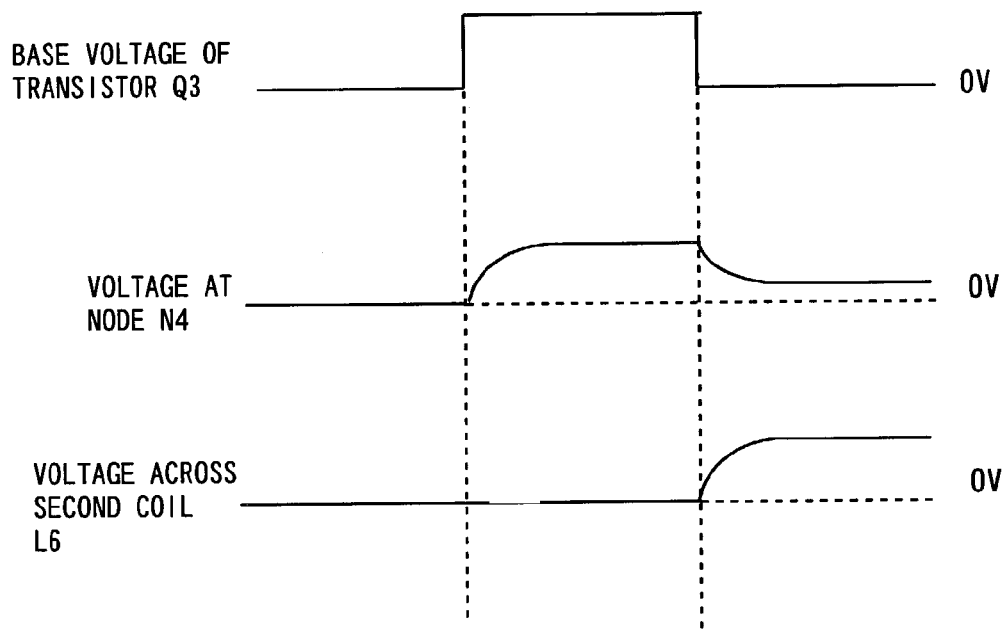
FIG. 15 is a timing chart for explaining the operations at the time of starting a power supply for the drive circuit shown in FIG. 14.

FIG. 14 is a circuit diagram showing an example of the configuration of the drive circuit 11 in the horizontal deflection circuit shown in FIG. 13. FIG. 15 is a timing chart for explaining the operations at the time of starting a power supply for the drive circuit 11 shown in FIG. 14.

The configuration of the drive circuit 11 shown in FIG. 14 is the same as the configuration of the drive circuit 11 shown in FIG. 8. The switching transistor Q3 shown in FIG. 14 has its emitter connected to a node N4 of the drive circuit 11.

As shown in FIG. 15, the power supply control circuit 13 raises a base voltage of the switching transistor Q3 to a high level when the power supply V1 is started, to turn the switching transistor Q3 on. Consequently, the power supply voltage $V_{cc}$ from the DC power supply V2 is supplied to the node N4 of the drive circuit 11, and is further supplied as a drive voltage to the gate of the transistor Q2 through a resistor R1. The power supply control circuit 13 turns the switching transistor Q3 off before a voltage induced in a second coil L6 rises.

In such a manner, a sufficient drive voltage can be supplied to the second resonant circuit before the first resonant circuit starts the resonance operation, thereby making it possible for the second resonant circuit to stably perform the resonance operation. The transistor Q3 may be replaced with an MOSFET or a mechanical switch such as a relay.

Figure 16:
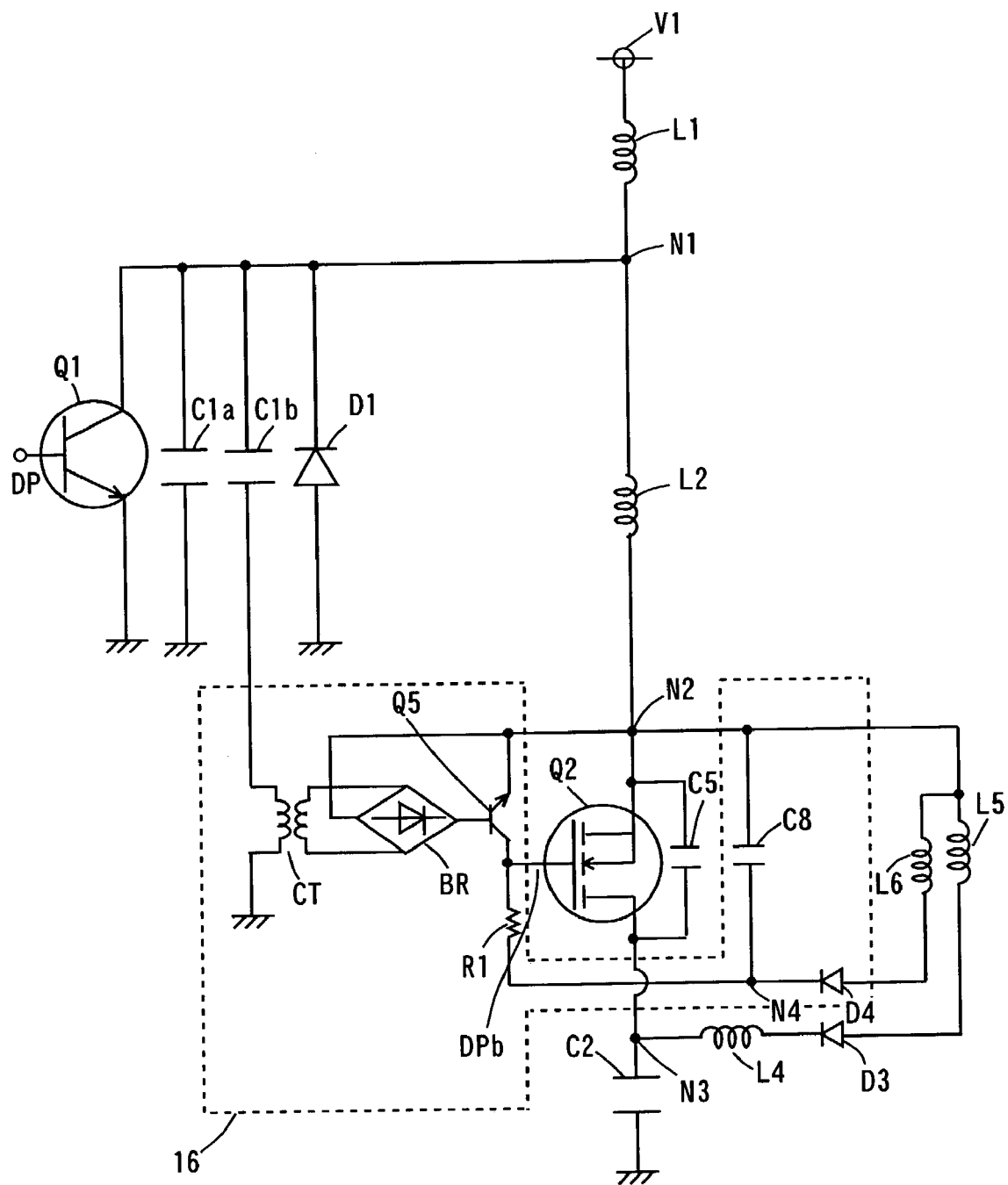
FIG. 16 is a circuit diagram showing the configuration of a horizontal deflection circuit according to a sixth embodiment of the present invention.
Figure 17:
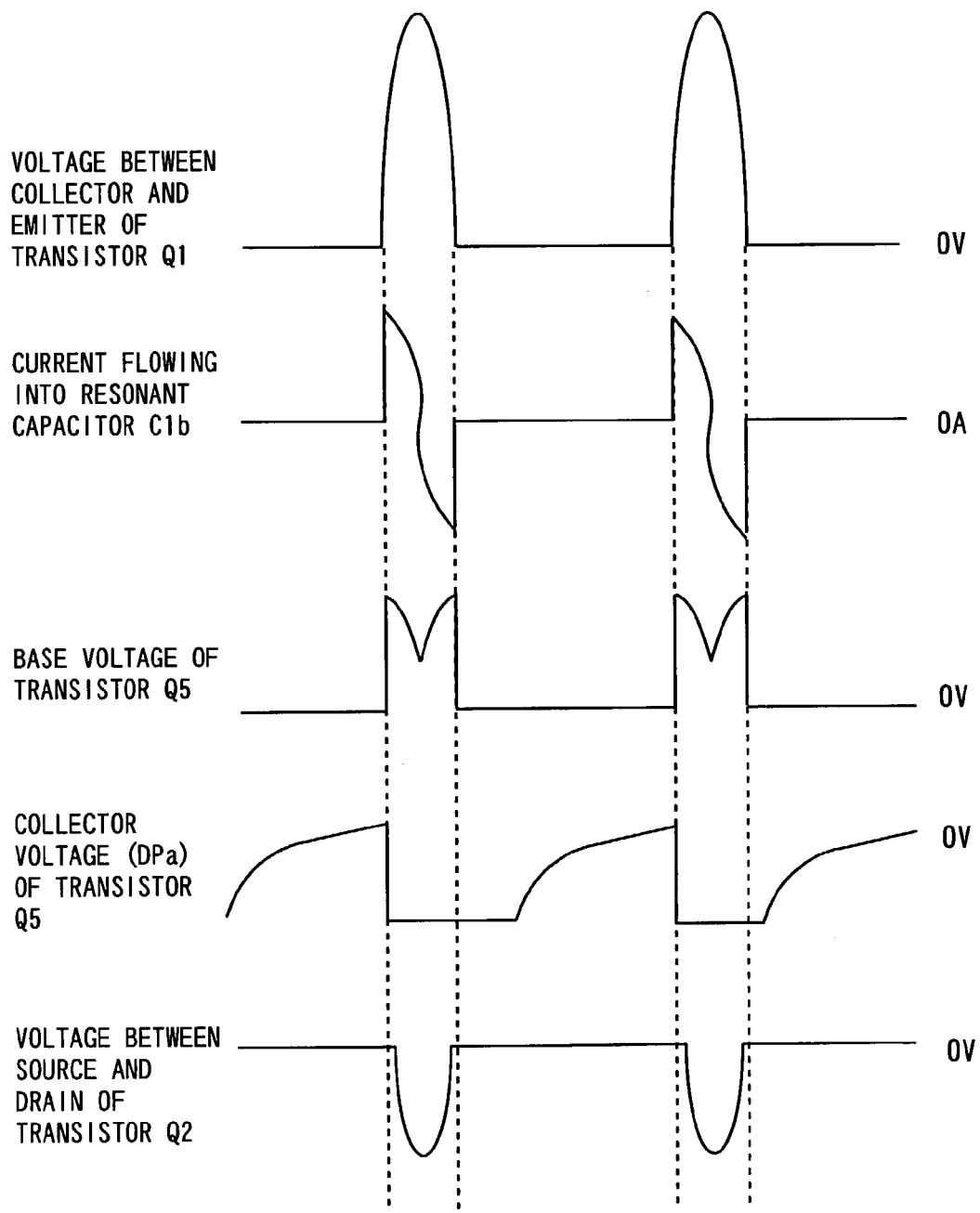
FIG. 17 is a timing chart for explaining the operations of the horizontal deflection circuit shown in FIG. 16.

FIG. 16 is a circuit diagram showing the configuration of a horizontal deflection circuit according to a sixth embodiment of the present invention. FIG. 17 is a timing chart for explaining the operations of the horizontal deflection circuit shown in FIG. 16. The horizontal deflection circuit in the sixth embodiment is a horizontal deflection circuit using a current-voltage conversion system (a resonance drive system).

The horizontal deflection circuit shown in FIG. 16 differs from the horizontal deflection circuit shown in FIG. 6 in that the resonant capacitor C1 is divided into two resonant capacitors C1a and C1b, and a drive circuit 16 is provided.

The drive circuit 16 comprises a transistor Q5, a resistor R1, a smoothing diode D4, a smoothing capacitor C8, a current detecting transformer CT, and a bridge circuit BR.

The resonant capacitor C1a is connected between a node N1 and a ground terminal. One end of the resonant capacitor C1b is connected to the node N1, and the other end thereof is connected to the ground terminal through a primary winding of the current detecting transformer CT. Both ends of a secondary winding of the current detecting transformer CT are connected to a pair of terminals of the bridge circuit BR. The other pair of terminals of the bridge circuit BR is connected to a node N2 and the base of the transistor Q5. The configuration of the remainder of the horizontal deflection circuit shown in FIG. 6 is the same as the configuration of the horizontal deflection circuit shown in FIG. 6.

As shown in FIG. 17, a resonant pulse voltage having a positive polarity is generated between the collector and the emitter of a transistor Q1 in response to a drive pulse DP. A current corresponding to the resonant pulse voltage flows into the resonant capacitor C1b, and flows into the primary winding of the current detecting transformer CT. A voltage induced in the secondary winding of the current detecting transformer CT is full-wave rectified by the bridge circuit BR, and is supplied to the base of the transistor Q5. Consequently, a voltage obtained by reversing a base voltage of the transistor Q5 from the collector of the transistor Q5 is outputted as a drive voltage. As a result, a resonant pulse voltage having a negative polarity appears between the source and the drain of the transistor Q5.

In such a manner, it is possible to drive a transistor Q2 such that the transistor Q2 is always turned off when the transistor Q1 is turned off.

In the horizontal deflection circuit according to the present embodiment, the control is simple, the necessity of high voltage components is eliminated, and wires are not drawn from the power supply to the horizontal deflection circuit. Consequently, the circuit scale is reduced, and the cost is lowered.

Figure 18:
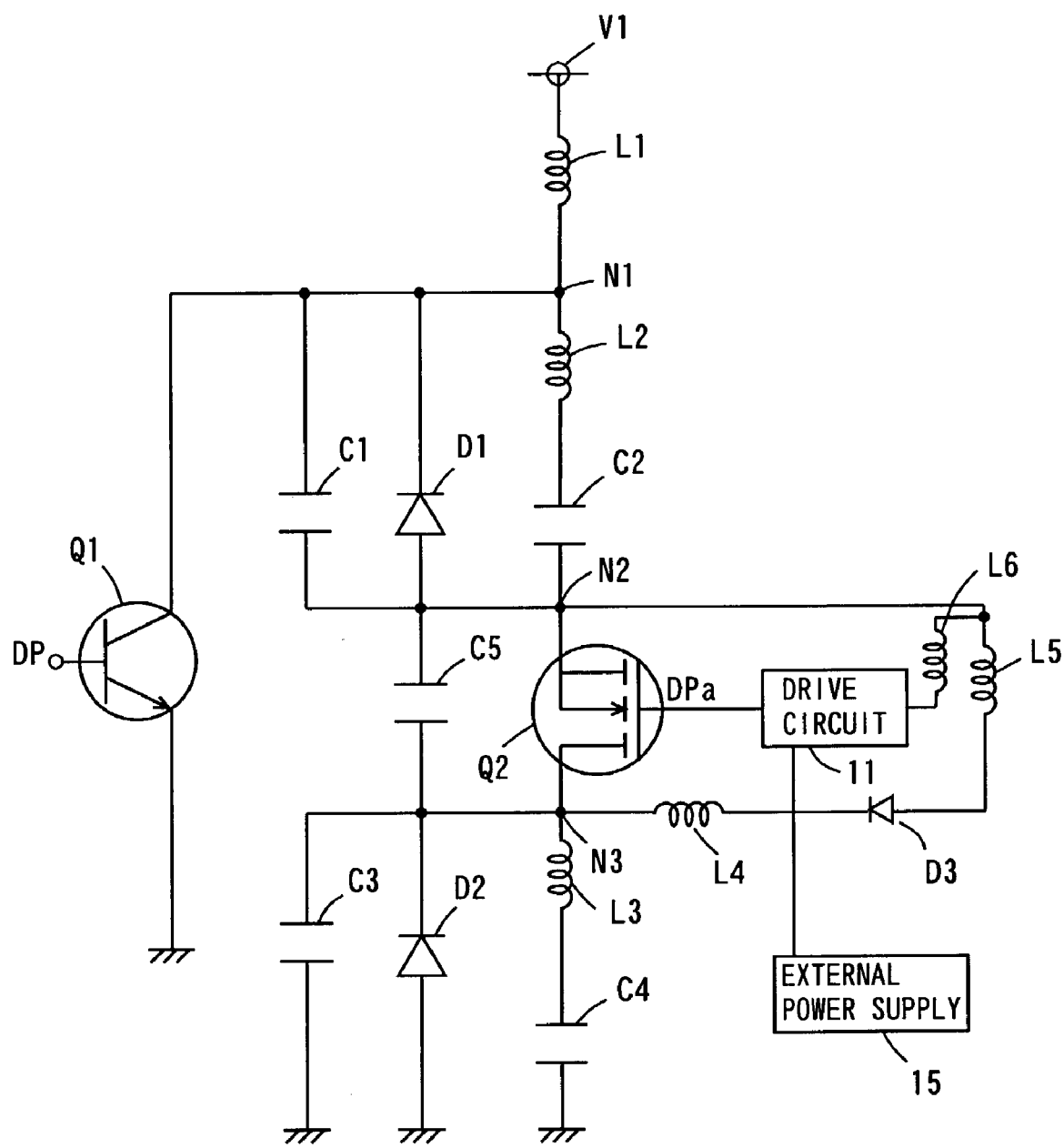
FIG. 18 is a circuit diagram showing the configuration of a horizontal deflection circuit according to a seventh embodiment of the present invention.

A horizontal deflection circuit according to a seventh embodiment of the present invention will be described. FIG. 18 is a circuit diagram showing the configuration of the horizontal deflection circuit according to the seventh embodiment of the present invention. The horizontal deflection circuit in the seventh embodiment is a horizontal deflection circuit using an external power supply system.

The horizontal deflection circuit shown in FIG. 18 differs from the horizontal deflection circuit shown in FIG. 2 in that an external power supply 15 is connected to a drive circuit 11. The configuration of the drive circuit 11 shown in FIG. 18 is the same as the configuration of the drive circuit shown in FIG. 8. The configuration of the remainder of the horizontal deflection circuit shown in FIG. 18 is the same as the configuration of the horizontal deflection circuit shown in FIG. 2. Further, the operations at the stationary time of the horizontal deflection circuit shown in FIG. 18 are the same as the operations shown in FIG. 3.

In the horizontal deflection circuit shown in FIG. 18, a drive voltage is supplied to a transistor Q2 from the external power supply 15 before a drive voltage to be supplied to the transistor Q2 from the drive circuit 11 rises on the basis of a voltage induced in a second coil L6 when a power supply V1 is started.

Here, before a first resonant circuit starts a resonance operation upon application of a voltage to a primary coil L1 of a deflection transformer by application of a drive pulse DP to the base of a transistor Q1, the drive voltage is supplied to the transistor Q2 from the external power supply 15. That is, the external power supply 15 supplies the drive voltage to the gate of the transistor Q2 before the first resonant circuit performs the resonance operation. Consequently, a sufficient drive voltage can be supplied to a second resonant circuit before the first resonant circuit starts the resonance operation, thereby making it possible for the second resonant circuit to stably perform a resonance operation.

In the present embodiment, the external power supply 15 corresponds to voltage supply means.

Figure 19:
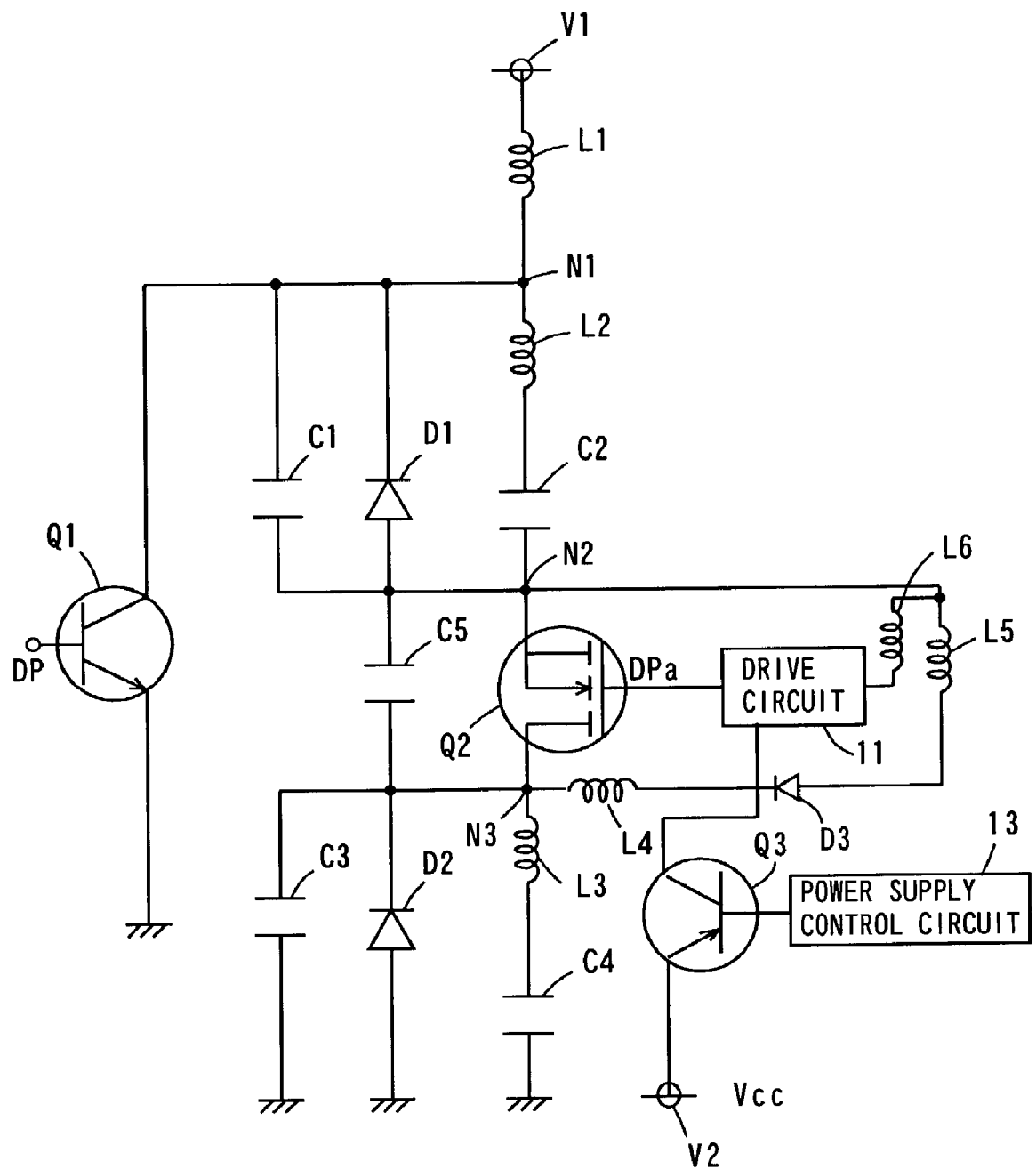
FIG. 19 is a circuit diagram showing the configuration of a horizontal deflection circuit according to an eighth embodiment of the present invention.
Figure 21:
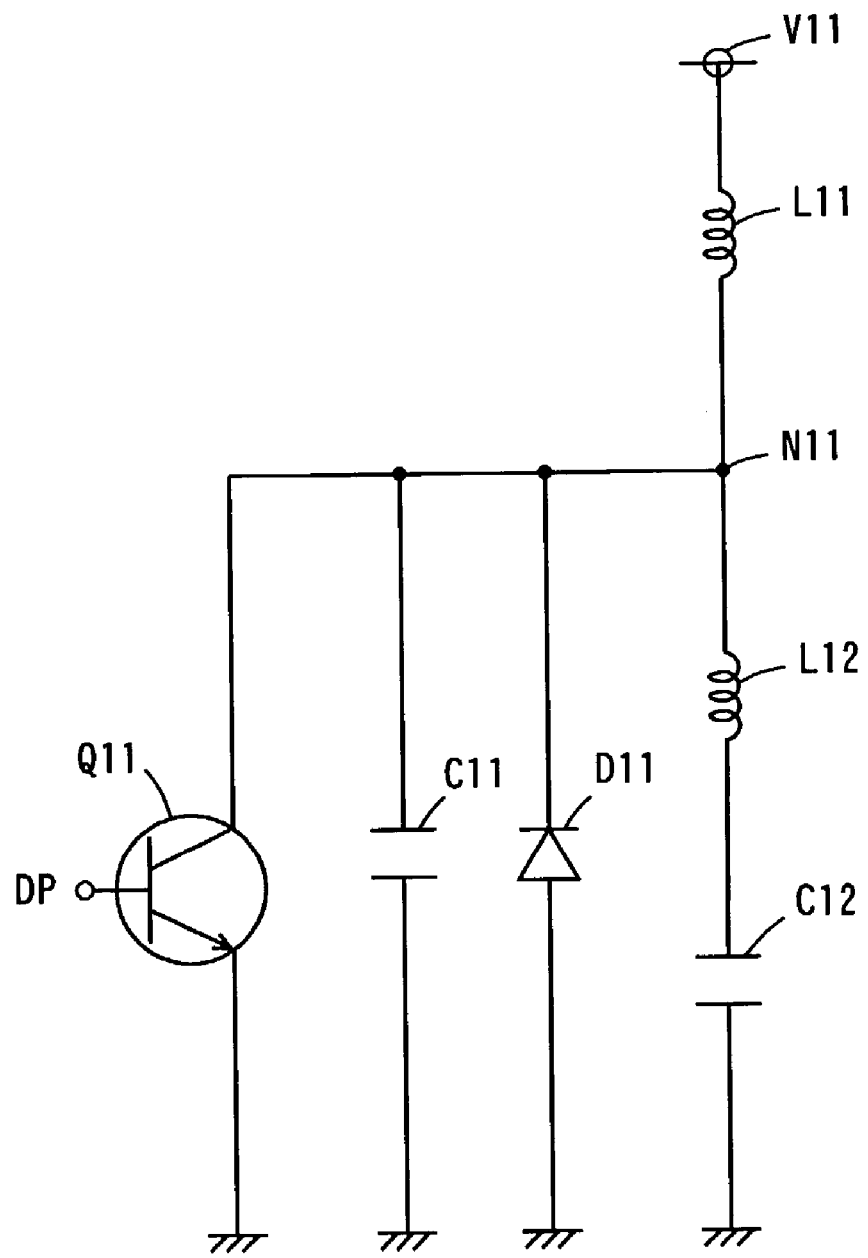
FIG. 21 is a circuit diagram showing one example of the configuration of a conventional horizontal deflection circuit.
Figure 22:
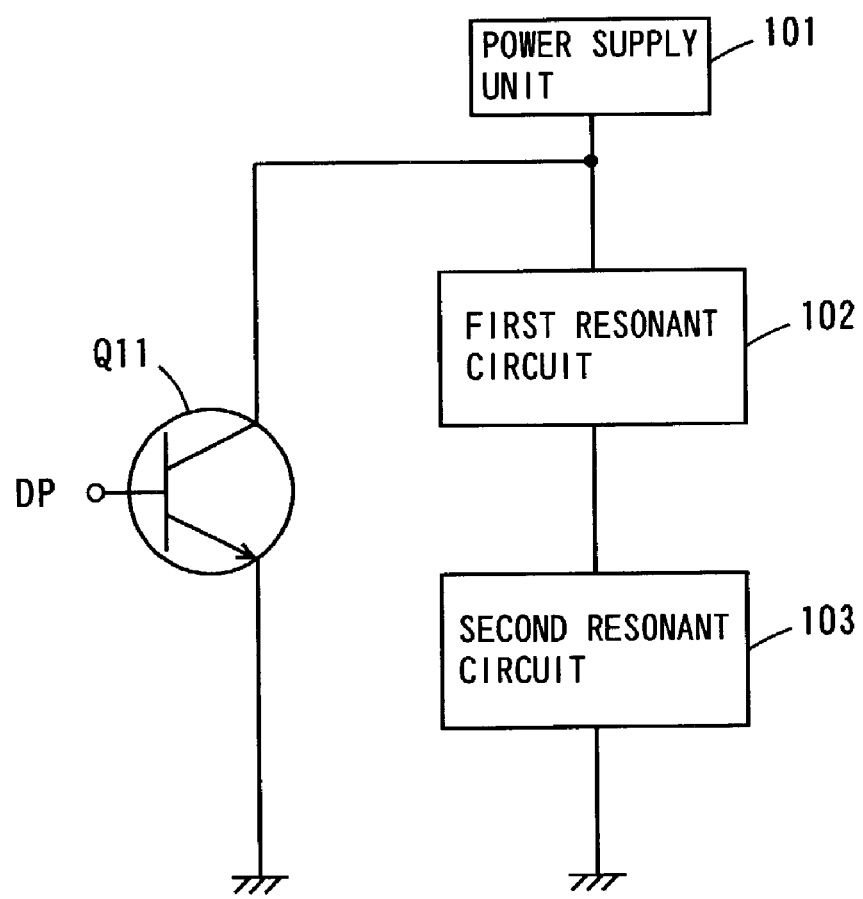
FIG. 22 is a block diagram showing another example of the configuration of the conventional horizontal deflection circuit.
Figure 23:
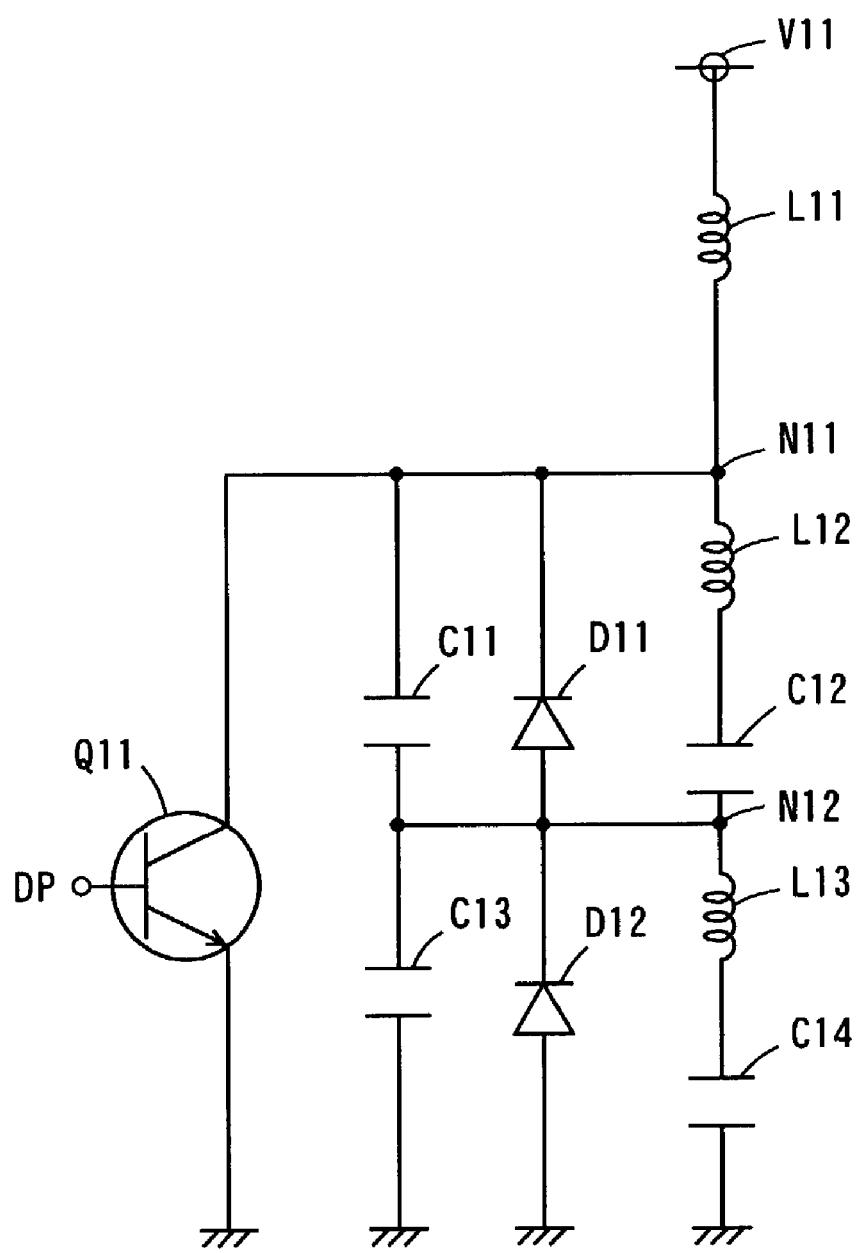
FIG. 23 is a circuit diagram showing the configuration of the conventional horizontal deflection circuit shown in FIG. 22.
Figure 24:
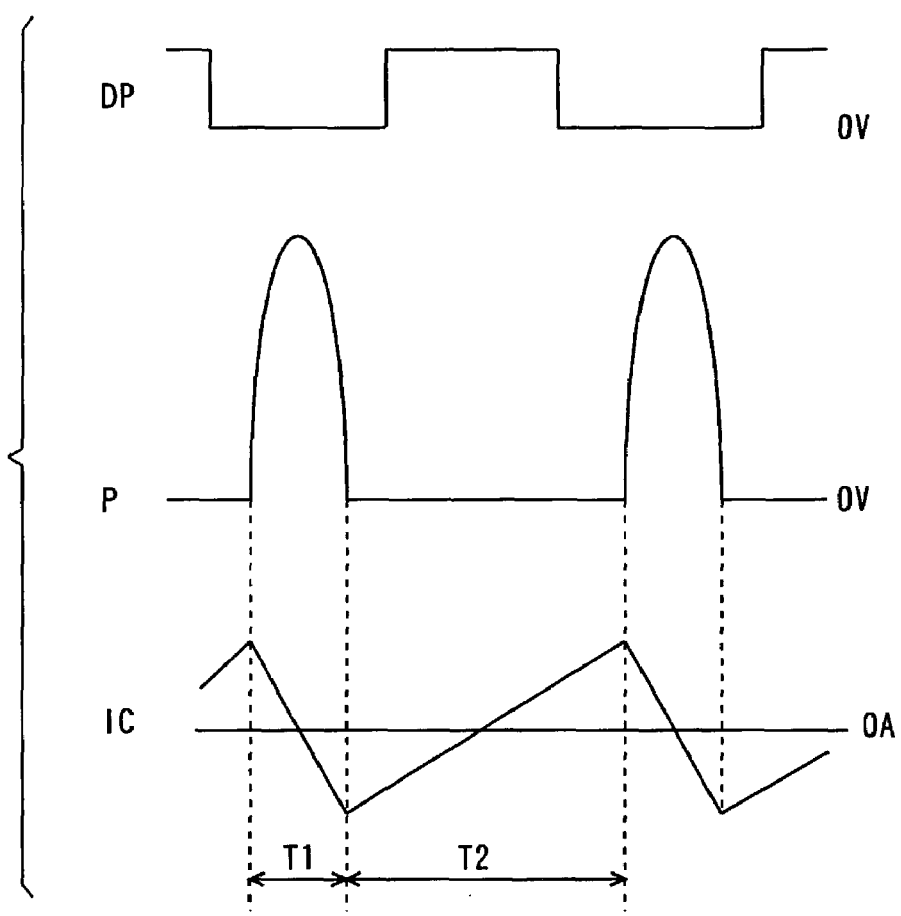
FIG. 24 is a timing chart for explaining the operations of the horizontal deflection circuit shown in FIG. 23.

A horizontal deflection circuit according to an eighth embodiment of the present invention will be described. FIG. 19 is a circuit diagram showing the configuration of a horizontal deflection circuit according to the eighth embodiment of the present invention. The horizontal deflection circuit in the eighth embodiment is a horizontal deflection circuit using a power supply switching system.

The horizontal deflection circuit shown in FIG. 19 differs from the horizontal deflection circuit shown in FIG. 2 in that a switching transistor Q3 and a power supply control circuit 13 are further provided.

The switching transistor Q3 has its collector connected to a DC power supply V2 used for another circuit in a television receiver. The DC power supply V2 supplies a power supply voltage $V_{cc}$. The switching transistor Q3 has its emitter connected to a drive circuit 11, and its base connected to the power supply control circuit 13. The configuration of the drive circuit 11 shown in FIG. 19 is the same as the configuration of the drive circuit 11 shown in FIG. 8. The configuration of the remainder of the horizontal deflection circuit shown in FIG. 19 is the same as the configuration of the horizontal deflection circuit shown in FIG. 2. Further, the operations at the stationary time of the horizontal deflection circuit shown in FIG. 19 are the same as the operations shown in FIG. 3.

The power supply control circuit 13 controls the switching transistor Q3 so as to supply the power supply voltage $V_{cc}$ from the DC power supply V2 as a drive voltage for a transistor Q2 only until a second resonant circuit operates in a state where a first resonant circuit has not operated yet when a power supply V1 is started.

That is, before the first resonant circuit starts a resonance operation upon application of a voltage to a primary coil L1 of a deflection transformer by application of a drive pulse DP to the base of a transistor Q1, the power supply control circuit 13 renders the switching transistor Q3 conductive, to supply a drive voltage to the transistor Q2 from the power supply V2.

The power supply control circuit 13 controls an operation for rendering the switching transistor Q3 conductive/non-conductive so as to stop the supply of the drive voltage when the second resonant circuit starts a resonance operation. Consequently, a sufficient drive voltage can be supplied to the second resonant circuit before the first resonant circuit starts the resonance operation, thereby making it possible for the second resonant circuit to stably perform the resonance operation.

The drive voltage is supplied to the transistor Q2 by the power supply control circuit 13 until the second resonant circuit starts the resonance operation. Accordingly, the second resonant circuit can stably operate without being affected by the resonance operation performed by the first resonant circuit, thereby making it possible to stably perform the above-mentioned circuit operation as a high voltage horizontal deflection circuit.

In the present embodiment, the switching transistor Q3 and the power supply control circuit 13 correspond to voltage supply means, and the switching transistor Q3 corresponds to a second switching device.

According to the present invention, a first resonant pulse voltage is applied to a deflection coil by first resonant means, and a second resonant pulse voltage having an opposite polarity to that of the first resonant pulse voltage is applied to the deflection coil by second resonant means. The second resonant pulse voltage is not applied to switching means, and only the first resonant pulse voltage is applied thereto. Accordingly, a pulse voltage applied to the deflection coil can be increased without being limited by the voltage resistance of the switching means, thereby making it possible to increase the inductance value of the deflection coil to improve the optical characteristics and the distortion characteristics of a cathode-ray tube as well as to reduce a deflection current to reduce power consumption.

Furthermore, the drive voltage is supplied to the second resonant means by voltage supply means until the second resonant means starts the resonance operation. Accordingly, the second resonant means can stably operate even before the first resonant means performs the resonance operation, thereby making it possible to stably perform a circuit operation.

The drive circuit 16 in the horizontal deflection circuit shown in FIG. 16 is also applicable to the horizontal deflection circuit shown in FIG. 1. FIG. 20 is a circuit diagram showing the configuration of a horizontal deflection circuit according to a ninth embodiment of the present invention. The horizontal deflection circuit in the ninth embodiment is a horizontal deflection circuit using a current-voltage conversion system (a resonance drive system).

The horizontal deflection circuit shown in FIG. 20 differs from the horizontal deflection circuit shown in FIG. 2 in that two resonant capacitors C1a and C1b are further provided in addition to the resonant capacitor C1, and a drive circuit 16 is provided.

The drive circuit 16 comprises a transistor Q5, a resistor R1, a smoothing diode D4 and a smoothing capacitor C8, a current detecting transformer CT, and a bridge circuit BR.

The resonant capacitor C1a is connected between a node N1 and a ground terminal. One end of the resonant capacitor C1b is connected to the node N1, and the other end thereof is connected to the ground terminal through a primary winding of the current detecting transformer CT. Both ends of a secondary winding of the current detecting transformer CT are connected to a pair of terminals of the bridge circuit BR. The other pair of terminals of the bridge circuit BR is connected to a node N2 and the base of the transistor Q5. The configuration of the remainder of the horizontal deflection circuit shown in FIG. 2 is the same as the configuration of the horizontal deflection circuit shown in FIG. 2. Further, a timing chart for explaining the operations of the horizontal deflection circuit shown in FIG. 20 is the same as the timing chart shown in FIG. 17.

As shown in FIG. 17, a resonant pulse voltage having a positive polarity is generated between the collector and the emitter of a transistor Q1 in response to a drive pulse DP. A current corresponding to the resonant pulse voltage flows into the resonant capacitor C1b, and flows into the primary winding of the current detecting transformer CT. A voltage induced in the secondary winding of the current detecting transformer CT is full-wave rectified by the bridge circuit BR, and is supplied to the base of the transistor Q5. Consequently, a voltage obtained by reversing a base voltage of the transistor Q5 from the collector of the transistor Q5 is outputted as a drive voltage. As a result, a resonant pulse voltage having a negative polarity appears between the source and the drain of the transistor Q5.

In such a manner, it is possible to drive a transistor Q2 such that the transistor Q2 is always turned off when the transistor Q1 is turned off.

In the horizontal deflection circuit according to the present embodiment, the control is simple, the necessity of high voltage components is eliminated, and wires are not drawn from the power supply to the horizontal deflection circuit. Consequently, the circuit scale is reduced, and the cost is lowered.

As described in the foregoing, according to the present invention, a first resonant pulse voltage is applied to a deflection coil by first resonant means (a first resonant circuit), and a second resonant pulse voltage having an opposite polarity to that of the first resonant pulse voltage is applied to the deflection coil by second resonant means (a second resonant circuit). The second resonant pulse voltage is not applied to switching means (a switching circuit), and only the first resonant pulse voltage is applied thereto. Accordingly, a pulse voltage applied to the deflection coil can be increased without being limited by the voltage resistance of the switching means (switching circuit), thereby making it possible to increase the inductance value of the deflection coil to improve the optical characteristics and the distortion characteristics of a cathode-ray tube as well as to reduce a deflection current to reduce power consumption.

Furthermore, a drive voltage is supplied to the second resonant means (second resonant circuit) by voltage supply means until the second resonant means (second resonant circuit) starts a resonance operation. Accordingly, the second resonant means (second resonant circuit) can stably operate even before the first resonant means (first resonant circuit) performs a resonance operation, thereby making it possible to stably perform a circuit operation.

The invention claimed is:

1. A high voltage deflection circuit for supplying a deflection current to a deflection coil, comprising:
   a first resonant circuit including said deflection coil that applies a first resonant pulse voltage to said deflection coil;
   a switching circuit connected to said first resonant circuit that performs a switching operation in response to a predetermined drive signal;

a second resonant circuit, connected in series with said deflection coil and supplied with a drive voltage by a resonance operation of said first resonant circuit, that applies to said deflection coil a second resonant pulse voltage having an opposite polarity to that of said first resonant pulse voltage; and a third resonant circuit, connected in series with said first resonant circuit through said second resonant circuit, that performs a resonance operation in response to the switching operation of said switching circuit.

2. The high voltage deflection circuit according to claim 1, wherein said first resonant circuit is supplied with electric power through a first coil of a deflection transformer connected to a power supply, and said second resonant circuit comprises a resonant capacitor, and a switch connected in parallel with said resonant capacitor and supplied with a voltage obtained by smoothing a pulse voltage as a power supply voltage, said pulse voltage having an opposite polarity to that of said first resonant pulse voltage and being induced in a second coil of said deflection transformer by said first resonant pulse voltage.

3. The high voltage deflection circuit according to claim 2, wherein said second resonant circuit further comprises a drive circuit that produces a switch drive signal using a pulse voltage having an opposite polarity to that of said first resonant pulse voltage and induced in a third coil of said deflection transformer by said first resonant pulse voltage, and said switch performs a switching operation in response to the switch drive signal produced by said drive circuit.

4. The high voltage deflection circuit according to claim 2, wherein said second resonant circuit further comprises a drive circuit that produces a switch drive signal on the basis of said drive signal, and said switch performs a switching operation in response to the switch drive signal by said drive circuit.

5. The high voltage deflection circuit according to claim 2, wherein said second resonant circuit further comprises a current-voltage converter that converts a current flowing through said resonant capacitor into a voltage to produce a switch drive signal, and said switch performs a switching operation in response to the switch drive signal produced by said current-voltage converter.

6. The high voltage deflection circuit according to claim 1, wherein said drive signal is synchronized with a horizontal frequency.

7. The high voltage deflection circuit according to claim 1, wherein said first resonant circuit comprises an S-correction capacitor connected in series with said deflection coil, a resonant capacitor connected in parallel with said deflection coil, said second resonant circuit and said S-correction capacitor, and a damper diode connected in parallel with said resonant capacitor.

8. The high voltage deflection circuit according to claim 1, wherein said first resonant circuit comprises a first S-correction capacitor connected in series with said deflection coil, a first resonant capacitor connected in parallel with said deflection coil and said first S-correction capacitor, and a first damper diode connected in parallel with said first resonant capacitor, and said third resonant circuit comprises a resonant coil, a second S-correction capacitor connected in series with said resonant coil, a second resonant capacitor connected in parallel with said resonant coil and said second S-correction capacitor, and a second damper diode connected in parallel with said second resonant capacitor.

9. The high voltage deflection circuit according to claim 1, further comprising a voltage supply circuit that supplies a drive voltage to said second resonant circuit until said second resonant circuit starts a resonance operation.

10. The high voltage deflection circuit according to claim 9, wherein said first resonant circuit is supplied with electric power through a first coil of a deflection transformer connected to a power supply, said second resonant circuit comprises a resonant capacitor, and a first switch connected in parallel with said resonant capacitor and supplied with a voltage obtained by smoothing a pulse voltage as a power supply voltage, said pulse voltage having an opposite polarity to that of said first resonant pulse voltage and induced in a second coil of said deflection transformer by said first resonant pulse voltage, and said voltage supply circuit supplies the drive voltage to said first switch until said second resonant circuit starts the resonance operation.

11. The high voltage deflection circuit according to claim 10, wherein said voltage supply circuit comprises an external power supply for supplying the drive voltage to said first switch until said second resonant circuit starts the resonance operation.

12. A high voltage deflection circuit for supplying a deflection current to a deflection coil, comprising:

a first resonant circuit including said deflection coil that applies a first resonant pulse voltage to said deflection coil;

a switching circuit connected to said first resonant circuit that performs a switching operation in response to a predetermined drive signal;

a second resonant circuit, connected in series with said deflection coil and supplied with a drive voltage by a resonance operation of said first resonant circuit, that applies to said deflection coil a second resonant pulse voltage having an opposite polarity to that of said first resonant pulse voltage; and a voltage supply circuit that supplies a drive voltage to said second resonant circuit until said second resonant circuit starts a resonance operation, wherein said voltage supply circuit comprises a DC power supply, and a second switch that supplies a voltage to a first switch as the drive voltage from said DC power supply until said second resonant circuit starts the resonance operation.

13. The high voltage deflection circuit according to claim 10, wherein
said second resonant circuit further comprises
a drive circuit that produces a switch drive signal using a pulse voltage having an opposite polarity to that of said first resonant pulse voltage and induced in a third coil of said deflection transformer by said first resonant pulse voltage, and
said first switch performs a switching operation in response to the switch drive signal produced by said drive circuit.

14. The high voltage deflection circuit according to claim 9, wherein said drive signal is synchronized with a horizontal frequency.

15. The high voltage deflection circuit according to claim 9, wherein
said first resonant circuit comprises
an S-correction capacitor connected in series with said deflection coil,
a resonant capacitor connected in parallel with said deflection coil, said second resonant circuit and said S-correction capacitor, and
a damper diode connected in parallel with said resonant capacitor.

16. The high voltage deflection circuit according to claim 12, further comprising a third resonant circuit connected in series with said first resonant circuit through said second resonant circuit that performs a resonance operation in response to the switching operation of said switching circuit.

17. The high voltage deflection circuit according to claim 16, wherein
said first resonant circuit comprises
a first S-correction capacitor connected in series with said deflection coil,
a first resonant capacitor connected in parallel with said deflection coil and said first S-correction capacitor, and
a first damper diode connected in parallel with said first resonant capacitor, and
said third resonant circuit comprises
a resonant coil,
a second S-correction capacitor connected in series with said resonant coil,
a second resonant capacitor connected in parallel with said resonant coil and said second S-correction capacitor, and
a second damper diode connected in parallel with said second resonant capacitor.

18. A high voltage deflection circuit for supplying a deflection current to a deflection coil, comprising:
a first resonant circuit, including said deflection coil, that applies a first resonant pulse voltage to said deflection coil, said first resonant circuit being supplied with electric power through a first coil of a deflection transformer connected to a power supply;
a switching circuit, connected to said first resonant circuit, that performs a switching operation in response to a predetermined drive signal; and
a second resonant circuit, connected in series with said deflection coil and supplied with a drive voltage by a resonance operation of said first resonant circuit, that applies to said deflection coil a second resonant pulse voltage having an opposite polarity to that of said first resonant pulse voltage,
said second resonant circuit comprising
a resonant capacitor,
a current-voltage converter that converts a current flowing through said resonant capacitor into a voltage to produce a switch drive signal, and
a switch that performs a switching operation in response to the switch drive signal, said switch being connected in parallel with said resonant capacitor and supplied with a voltage obtained by smoothing a pulse voltage as a power supply voltage, said pulse voltage having an opposite polarity to that of said first resonant pulse voltage and being induced in a second coil of said deflection transformer by said first resonant pulse voltage.

19. The high voltage deflection circuit according to claim 18, further comprising a voltage supply circuit that supplies a drive voltage to said second resonant circuit until said second resonant circuit starts a resonance operation.

* * * * *